(12) United States Patent
Cutsforth

(10) Patent No.: US 9,590,376 B2
(45) Date of Patent: *Mar. 7, 2017

(54) BRUSH HOLDER ASSEMBLY MONITORING APPARATUS, ASSEMBLY, SYSTEM AND METHOD

(71) Applicant: Cutsforth, Inc., Cohasset, MN (US)

(72) Inventor: Robert S. Cutsforth, Bellingham, WA (US)

(73) Assignee: Cutsforth, Inc., Cohasset, MN (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/450,481

(22) Filed: Aug. 4, 2014

(65) Prior Publication Data

US 2014/0339965 A1    Nov. 20, 2014

Related U.S. Application Data

(63) Continuation of application No. 14/090,508, filed on Nov. 26, 2013, now Pat. No. 8,825,800, which is a
(Continued)

(51) Int. Cl.
| | |
|---|---|
| *G06F 15/16* | (2006.01) |
| *G06F 15/173* | (2006.01) |
| *H01R 39/58* | (2006.01) |
| *H04L 12/26* | (2006.01) |
| *G05B 23/02* | (2006.01) |
| *G06Q 10/06* | (2012.01) |

(Continued)

(52) U.S. Cl.
CPC ......... *H01R 39/58* (2013.01); *G05B 23/0208* (2013.01); *G05B 23/0218* (2013.01); *G06Q 10/06311* (2013.01); *G06Q 10/083* (2013.01); *G08B 21/182* (2013.01); *H02K 11/20* (2016.01); *H04L 43/04* (2013.01); *H04L 43/08* (2013.01); *H01R 43/002* (2013.01)

(58) Field of Classification Search
CPC ........................... G05B 23/0208; H01R 39/58
USPC ........................................................ 709/217
See application file for complete search history.

(56) References Cited

U.S. PATENT DOCUMENTS

| | | |
|---|---|---|
| 3,523,288 A | 8/1970 | Thompson |
| 4,024,525 A | 5/1977 | Baumgartner et al. |

(Continued)

FOREIGN PATENT DOCUMENTS

| | | |
|---|---|---|
| DE | 3417711 A1 | 11/1985 |
| EP | 1090702 A2 | 1/2004 |

(Continued)

*Primary Examiner* — Kristie Shingles
(74) *Attorney, Agent, or Firm* — Seager, Tufte & Wickhem LLP

(57) ABSTRACT

Methods and systems for monitoring a brush holder assembly and/or detecting wear of a brush in a brush holder assembly are disclosed. One method includes sending data from a plurality of remote monitoring locations to a central control unit, where the data may be evaluated in order to monitor states of brushes at a plurality of remote electrical facilities. For example, multiple images of a marker tracking longitudinal movement of the brush may be acquired. A comparison of the images, for example, a comparative imaging technique, such as pixel-by-pixel comparison, may then be performed in order to evaluate a condition of the brush, such as the wear rate, wear state, or life expectancy of the brush.

19 Claims, 16 Drawing Sheets

Related U.S. Application Data continuation of application No. 11/752,965, filed on May 24, 2007, now Pat. No. 8,618,943.

(51) Int. Cl.
*G06Q 10/08* (2012.01)
*G08B 21/18* (2006.01)
*H01R 43/00* (2006.01)

(56) References Cited

U.S. PATENT DOCUMENTS

| | | |
|---|---|---|
| 4,058,804 A | 11/1977 | Sawada et al. |
| 4,121,207 A | 10/1978 | Jones |
| 4,172,988 A | 10/1979 | Lowther |
| 4,272,695 A | 6/1981 | Buchwald et al. |
| 4,316,186 A | 2/1982 | Purdy et al. |
| 4,329,611 A | 5/1982 | Ohmstedt et al. |
| 4,329,683 A | 5/1982 | Kimberlin |
| 4,333,095 A | 6/1982 | Silva |
| 4,334,072 A | 6/1982 | Becker et al. |
| 4,344,009 A | 8/1982 | Reynolds |
| 4,348,608 A | 9/1982 | Michael |
| 4,390,870 A | 6/1983 | Michael |
| 4,400,638 A | 8/1983 | Albrecht et al. |
| 4,420,705 A | 12/1983 | Kimberlin |
| 4,488,078 A | 12/1984 | Orton |
| 4,513,495 A | 4/1985 | Kimberlin |
| 4,528,556 A | 7/1985 | Maddox |
| 4,528,557 A | 7/1985 | Braun |
| 4,536,670 A | 8/1985 | Mayer |
| 4,542,374 A | 9/1985 | Kollmannsberger |
| 4,577,151 A | 3/1986 | Tanisaka et al. |
| 4,636,778 A | 1/1987 | Corkran et al. |
| 4,646,001 A | 2/1987 | Baldwin et al. |
| 4,652,783 A | 3/1987 | Cheesmore et al. |
| 4,723,084 A | 2/1988 | Reynolds |
| 4,739,208 A | 4/1988 | Kimberlin |
| 4,743,787 A | 5/1988 | Bunner et al. |
| 4,761,594 A | 8/1988 | Rodi et al. |
| 4,918,348 A | 4/1990 | Fitzsimmons et al. |
| 4,950,933 A | 8/1990 | Pipkin et al. |
| 4,977,345 A | 12/1990 | Toperzer |
| 5,229,817 A | 7/1993 | Lange |
| 5,327,184 A | 7/1994 | Nomura et al. |
| 4,400,638 B1 | 11/1994 | Albrecht et al. |
| 5,488,261 A | 1/1996 | Swoboda et al. |
| 5,509,625 A | 4/1996 | Oullette |
| 5,731,650 A | 3/1998 | Scheucher |
| 5,753,995 A | 5/1998 | Ogino |
| 5,870,026 A | 2/1999 | Challenger |
| 6,034,531 A | 3/2000 | Senglat et al. |
| 6,067,159 A | 5/2000 | Discenzo et al. |
| 6,111,643 A | 8/2000 | Discenzo et al. |
| 6,255,955 B1 | 7/2001 | Blaettner |
| 6,359,690 B1 | 3/2002 | Discenzo et al. |
| 6,495,940 B2 | 12/2002 | Kliman et al. |
| 6,580,511 B1 | 6/2003 | Discenzo |
| 6,933,650 B2 | 8/2005 | Wang |
| 6,960,922 B2 | 11/2005 | Klaar |
| 6,966,754 B2 | 11/2005 | Wobben |
| 6,972,681 B2 | 12/2005 | Matsuoka et al. |
| 7,010,959 B2 | 3/2006 | Dingfelder et al. |
| 7,045,929 B2 | 5/2006 | Yu |
| 7,049,532 B2 | 5/2006 | Kanazawa et al. |
| 7,358,640 B2 | 4/2008 | Itou et al. |
| 7,551,288 B2 | 6/2009 | Discenzo |
| 7,705,744 B2 * | 4/2010 | Cutsforth ........... G05B 23/0232 340/648 |
| 7,916,038 B2 | 3/2011 | Cutsforth |
| 8,618,943 B2 | 12/2013 | Cutsforth et al. |
| 8,825,800 B2 * | 9/2014 | Cutsforth ............... H01R 39/58 709/217 |
| 2014/0077960 A1 | 3/2014 | Cutsforth |

FOREIGN PATENT DOCUMENTS

| | | |
|---|---|---|
| EP | 1090702 B1 | 1/2004 |
| JP | 60039337 A | 3/1985 |
| WO | 0219698 A2 | 3/2002 |

* cited by examiner

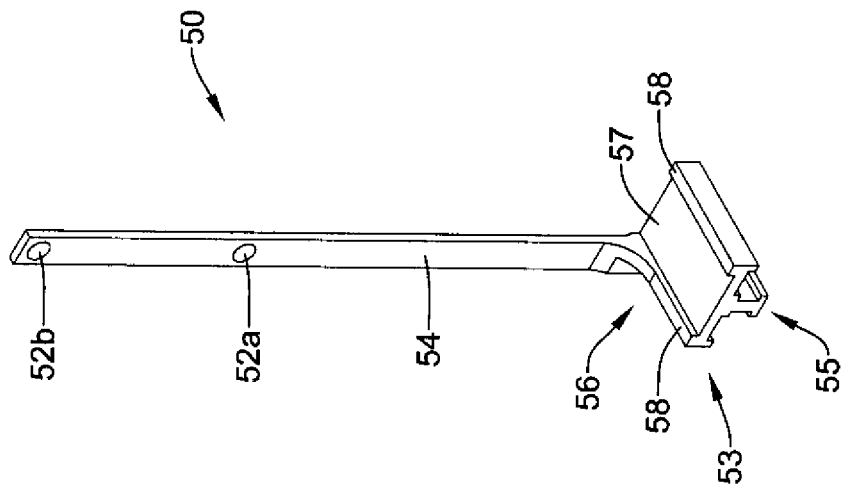

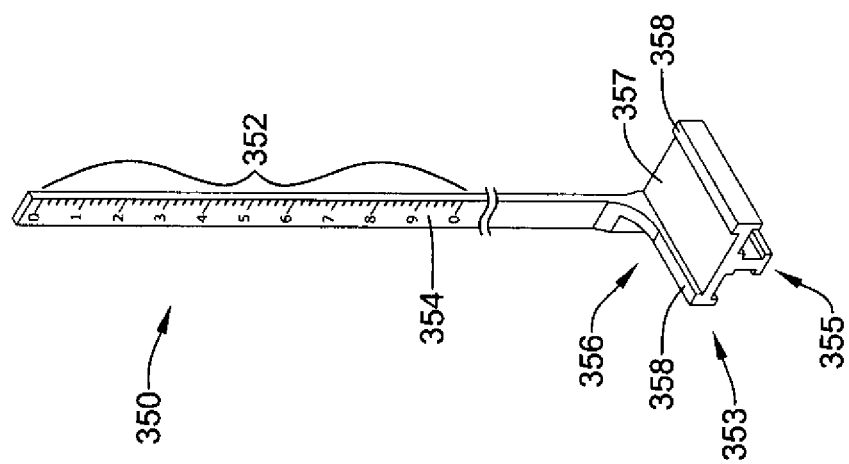

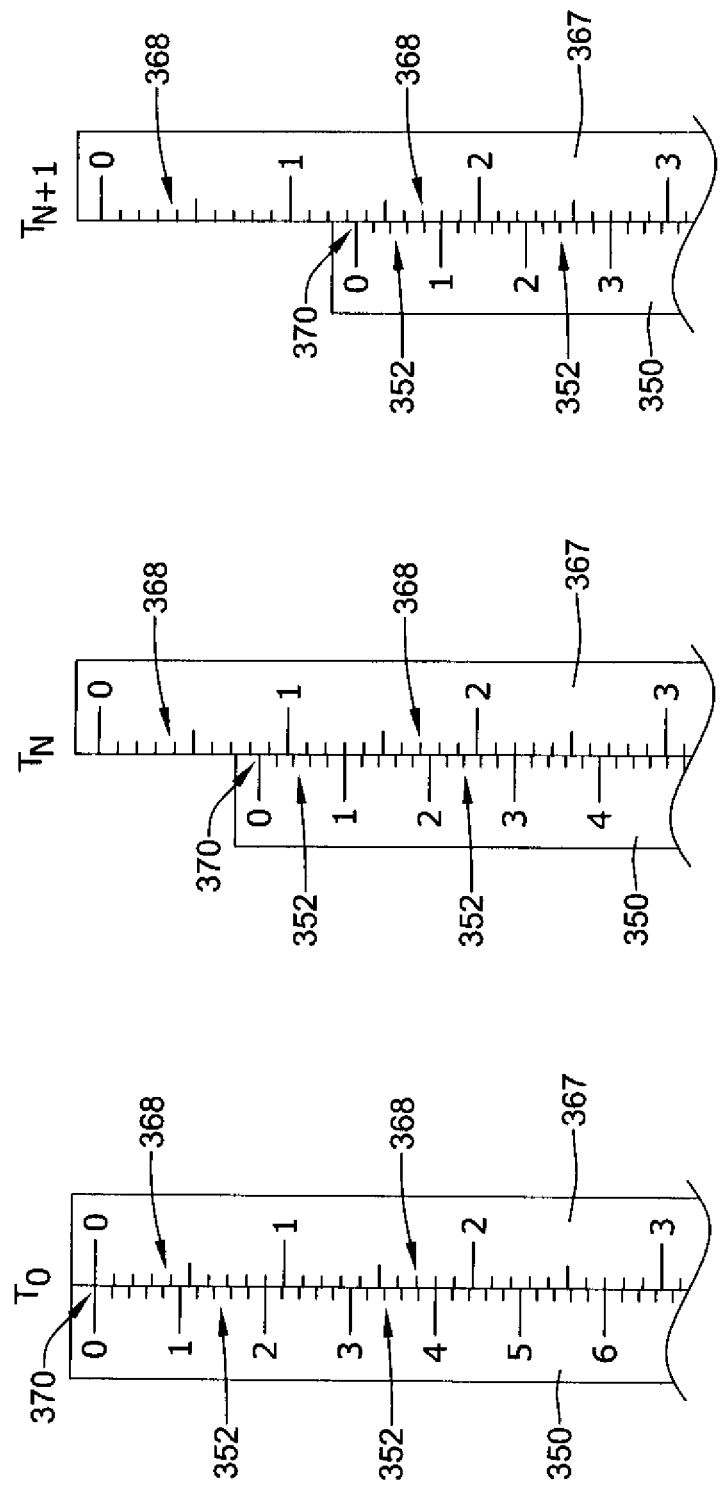

BRUSH HOLDER ASSEMBLY MONITORING APPARATUS, ASSEMBLY, SYSTEM AND METHOD

CROSS-REFERENCES TO RELATED APPLICATIONS

The present application is a continuation application of U.S. patent application Ser. No. 14/090,508, filed Nov. 26, 2013 which is a continuation of U.S. patent application Ser. No. 11/752,965, filed May 24, 2007, now U.S. Pat. No. 8,618,943 the complete disclosures of which are herein incorporated by reference.

TECHNICAL FIELD

The disclosure generally relates to monitoring systems for monitoring brushes and brush holder assemblies that may be used in electrical devices and/or slip ring assemblies. More specifically, the disclosure relates to monitoring apparatus, assemblies, systems and methods of monitoring the wear of a brush in a brush holder assembly.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current.

In some designs, a brush box type brush holder, or other type of brush holder, may be used to support the brush during operation. The brush and brush box may be designed such that the brush can slide within the brush box to provide for continuing contact between the brush and the conductive surface contacted by the brush. Over time, the brush will be reduced in size, or get shorter (i.e., diminish in longitudinal length), for example, as the wear surface of the brush in frictional contact with the conductive surface wears down. Once a brush has worn beyond a threshold amount, a brush may need to be replaced and/or maintenance may need to be performed.

SUMMARY

Some embodiments relate to an apparatus, assembly, system and/or method for monitoring a brush holder assembly and/or detecting wear of a brush in a brush holder assembly.

Accordingly, one exemplary embodiment relates to a method of monitoring a brush holder assembly and/or detecting wear of a brush in a brush holder assembly. The method may include sending data from one or more, or a plurality of remote monitoring locations to a central control unit, where the data may be evaluated in order to monitor states of brush holder assemblies at a plurality of remote facilities.

Another exemplary embodiment relates to a method of monitoring a brush holder assembly. A signal representing an image of a brush holder assembly may be generated by an imaging device in proximity to the brush holder assembly and then inputted to a processing unit. The signal may then be analyzed in order to determine a condition of the brush holder assembly, such as the wear state, wear rate, or life expectancy of a brush of the brush holder assembly. In some instances, an output signal may be generated to alert personnel of an anomalous or threshold condition of the brush, or schedule technician intervention.

Another exemplary embodiment relates to a method of determining the wear of a brush. The method may include acquiring a first image of a marker tracking longitudinal movement of the brush. After acquiring a second or subsequent image of the marker, a comparison of the first image and the second image using a comparative imaging technique, such as pixel-by-pixel comparison or visual inspection, may be performed in order to evaluate a condition of the brush, such as the wear rate, wear state, or life expectancy of the brush.

Another exemplary embodiment relates to a system for monitoring a brush holder assembly and/or detecting wear of a brush in a brush holder assembly. The system may include an imaging device in line of sight of the brush holder assembly and/or the marker of a brush holder assembly and a processing unit for evaluating data constituting images generated by the imaging device.

Another exemplary embodiment relates to a system for monitoring brush holder assemblies and/or the wear of brushes of brush holder assemblies. The system may include a plurality of remote monitoring locations, wherein each remote monitoring location generates data regarding a brush holder assembly, such as the position of one or more brushes of a brush holder assembly, at the remote monitoring location, and a central control unit for receiving the data from the plurality of remote monitoring locations.

Another exemplary embodiment relates to an assembly for monitoring a brush holder assembly and/or detecting wear of a brush in a brush holder assembly. The assembly may include a brush, a brush holder for guiding movement of the brush, and a marker for tracking movement of the brush.

Yet, another exemplary embodiment relates to an apparatus for a brush holder assembly which may be used in monitoring a brush holder assembly and/or detecting wear of a brush in a brush holder assembly. The apparatus may include a marker, which may include one or a plurality of indicia or markings, such as targets and/or graduation or tick marks, for tracking movement of a brush in a brush holder assembly.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which:

FIG. 3A is a perspective view of an illustrative marker for a brush holder assembly;

FIG. 3B is a perspective view of another illustrative marker for a brush holder assembly;

FIG. 11 is an illustrative representation of an image of another exemplary marker of a brush holder assembly taken at time, $T_O$;

FIG. 12 is an illustrative representation of an image of another exemplary marker of a brush holder assembly taken at time, $T_N$;

FIG. 13 is an illustrative representation of an image of another exemplary marker of a brush holder assembly taken at time, $T_{N+1}$;

Figure 1:
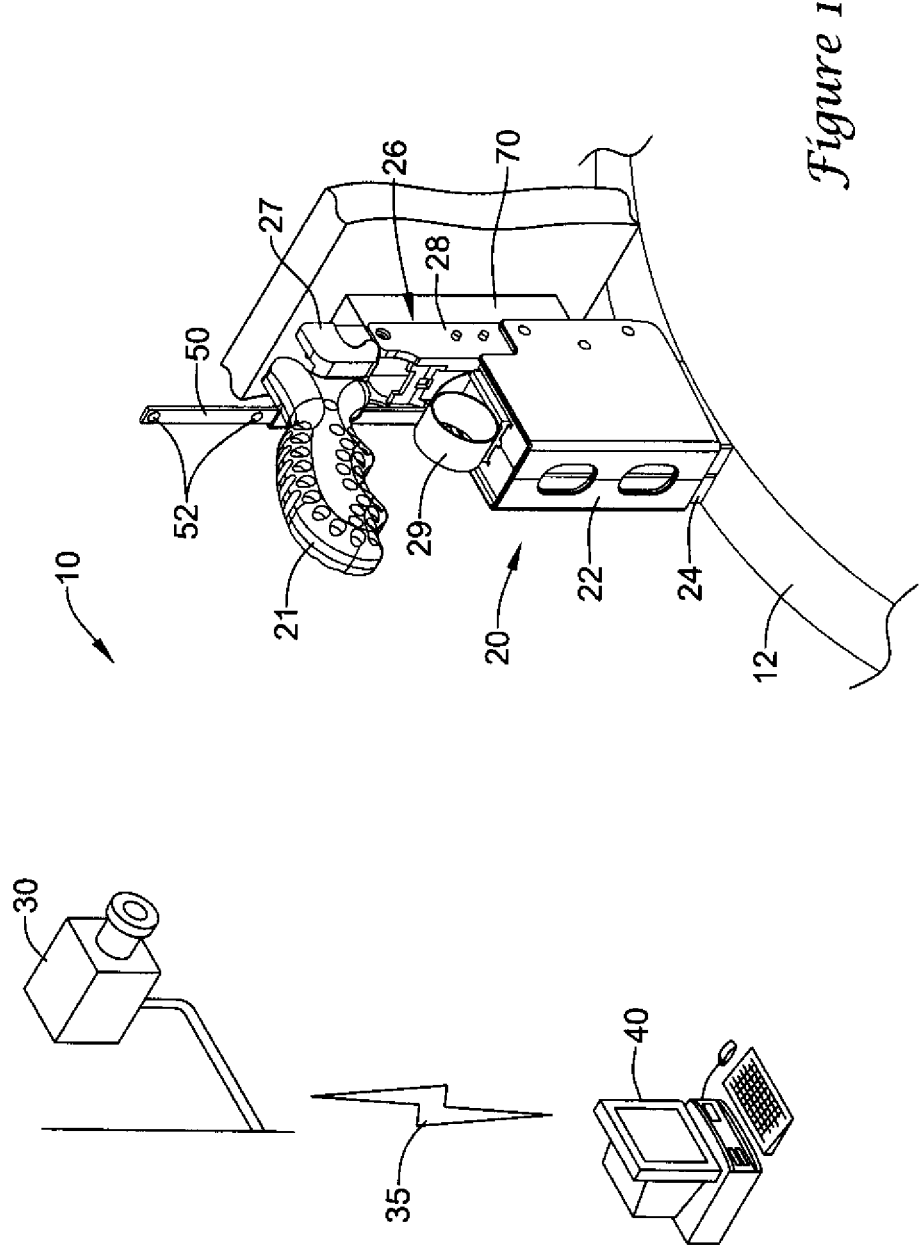
FIG. 1 is an illustrative view of an exemplary brush monitoring system.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Now referring to FIG. 1, an illustrative system for monitoring a brush holder assembly and/or brush wear of a brush of a brush holder assembly is shown. In some embodiments, the monitoring system may resemble a monitoring system as described in U.S. patent application entitled "Monitoring Systems and Methods for Monitoring the Condition of One or More Components of an Electrical Device" filed on the same date as the present application and assigned attorney docket number 1099.1110101, which is herein incorporated by reference in its entirety. The monitoring system 10 includes a signal generating device such as an imaging device 30, or a plurality of imaging devices 30, and a processing unit 40 or a plurality of processing units 40 for monitoring a brush holder assembly 20. In some embodiments, the brush holder assembly 20 may substantially resemble a brush holder assembly as described in U.S. patent application Ser. No. 10/322,957, entitled "Brush Holder Apparatus, Brush Assembly, and Method", which is herein incorporated by reference in its entirety. However, the illustrative brush holder monitoring system 10 may be amenable to any of various brush holder assembly configurations. Thus, the intention is that the disclosed monitoring system 10 may be used in conjunction with any desired brush holder assembly configurations of an electrical device, such as an industrial electrical generator. For example, the disclosed monitoring system 10 may be used with brush holder assemblies, brush holders and/or brushes disclosed in U.S. Pat. Nos. 6,731,042; 5,753,992; 5,621,262; 5,463,264; 5,397,952; and 5,256,925; each of which is incorporated herein by reference.

The imaging device 30, which may be a camera, a video camera, an infra-red camera, a web-cam, or other such imaging device, may be able to capture an analog and/or digital image of the marker 50 of the brush holder assembly 20 and/or other portions of the brush holder assembly 20. For example, the imaging device 30 may be positioned in proximity to the brush holder assembly 20 such that the imaging device 30 may be in an unobstructed visual pathway (e.g., line of sight) to the marker 50 and/or another portion of the brush holder assembly 20. In applications where multiple brush holder assemblies 20 and/or brushes 24 are present, multiple imaging devices 30 may be needed in order to sufficiently monitor the plurality of brush holder assemblies 20 and/or brushes 24. For example, a plurality of imaging devices 30 may be located at multiple radial directions from an electrical equipment, such as an industrial generator and/or electrical motor, in order to obtain a visual pathway to a plurality of markers 50 corresponding to and associated with a plurality of brushes 24 of multiple brush holder assemblies 20 positioned radially about a component, such as a collector ring, a slip ring or a commutator, of the electrical equipment. In some applications, a single imaging device 30 may accommodate a plurality of brushes 24 and/or brush holder assemblies 20. For example, in some embodiments, a single analog and/or digital image may be used to evaluate a plurality of brushes 24. For example, in some applications, a bank of a plurality of brushes 24 may be positioned at a single and/or similar radially located position about a component, such as a collector ring, a slip ring or a commutator, of an electrical equipment. Thus, a single imaging device 30 may capture each of the markers 50 corresponding to and associated with each of the plurality of brushes 24 configuring the bank of brushes 24 in a single analog and/or digital image.

In some embodiments, an imaging device 30 may be positioned to capture images of a marker 50, brush 24 and/or another portion of a brush holder assembly 20 of a plurality of brushes, brush holders and/or brush holder assemblies of an electrical device (e.g., electrical generator). In such embodiments, evaluation of images taken of the marker 50, brush 24 and/or other portion of the brush holder assembly 20 may be representative of other brushes, brush holders and/or brush holder assemblies of the electrical device. Thus, if an anomalous or threshold condition is detected regarding the monitored marker 50, brush 24 and/or other portion of the brush holder assembly 20, an inference or assessment may be made that other brushes, brush holders and/or brush holder assemblies of the electrical device may, similarly, require inspection, maintenance, replacement, etc. Thus, a single imaging device 30 may be used to monitor a plurality of brushes, brush holders and/or brush holder assemblies by acquiring images of one of the plurality of brushes, brush holders and/or brush holder assemblies.

The imaging device 30 may communicate with a processing unit 40 in order to send or transmit a signal 35, such as analog and/or digital images, to the processing unit 40. For example, the imaging device 30 may be wired to the processing unit 40, or the imaging device 30 may send or transmit data representing analog and/or digital images to the processing unit 40 remotely and/or wirelessly. In some embodiments, the processing unit 40 may be located in the same location (e.g., same room, building, facility, etc.) as the imaging device 30, or the processing unit 40 may be located at a location remote from the imaging device 30 (e.g., different building, facility, city, county, state, country, etc.).

Moreover, in some embodiments a processing unit 40 may be located on-site with an associated imaging device 30 communicating with the processing unit 40. In describing that the processing unit 40 may be located on-site with an associated imaging device 30, what is meant is that the processing unit 40 may be located at the same site or location (e.g., same electrical facility) in which the imaging device 30 is located. In other embodiments, a processing unit 40 may be located off-site from an associated imaging device 30 communicating with the processing unit 40. In describing that the processing unit 40 may be located off-site from an associated imaging device 30, what is meant is that the processing unit 40 may be located at a different or distant site or location (e.g., distant of the electrical facility) from the site or location in which the imaging device 30 is located.

Figure 2:
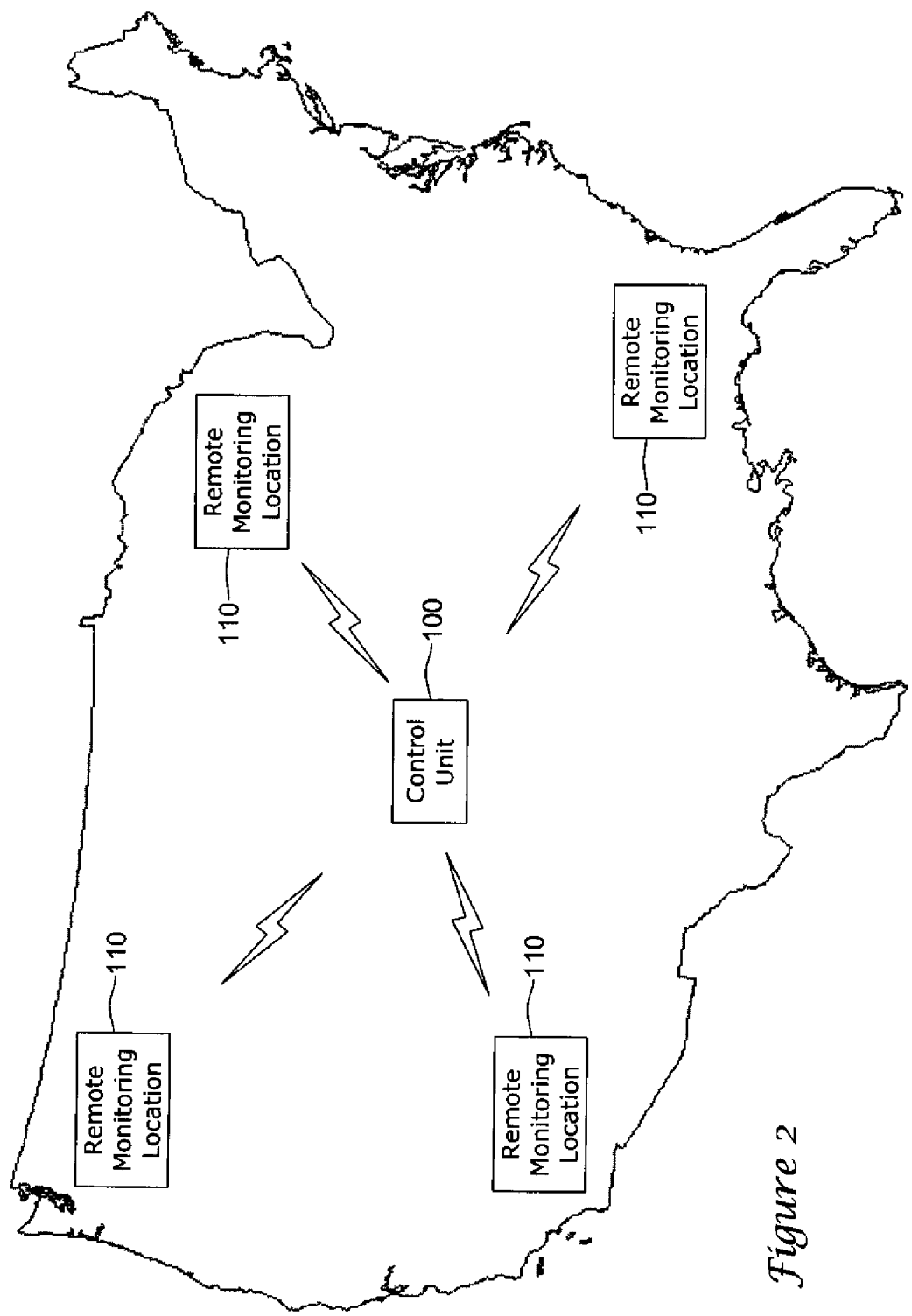
FIG. 2 is an illustrative representation of a network of remote monitoring locations communicating with a control unit.

In some embodiments, the monitoring system 10 may include a data communications network, such as a Local Area Network (LAN), for example a wired LAN or a wireless LAN, or the Internet, connecting multiple imaging devices 30 and/or multiple processing units 40. Thus, the processing unit 40 and/or a control unit 100 (in some embodiments the control unit 100 may include the processing unit 40) may be in a centralized location networked to the monitoring system 10 acquiring multiple analog and/or digital images or signals from multiple imaging devices 30 simultaneously, sequentially, periodically, intermittently, selectively and/or manually, for example. As shown in FIG. 2, in some embodiments, images or data signals sent or transmitted from multiple remote monitoring locations 110, each having one or more, or a plurality of, imaging devices 30 and/or processing units 40 of a monitoring system 10, may be sent or transmitted to one or more central control units 100 for processing and/or evaluation. When describing the one or more control units 100 as being in a centralized location, it is not intended to limit the control unit 100 to a location equidistant to all the remote monitoring locations 110, although this arrangement may be realized in some embodiments. The intention when describing the control unit 100 as a central control unit is to describe the control unit 100 as a site for consolidating data transmitted from multiple remote locations 110. Thus, in some embodiments the control unit 100 may be described as a master control center. It is noted that the intention is not to be limited to a single control unit 100, as multiple control units 100, each receiving data from one or a plurality of remote locations 110, may be located at different locations. For example, multiple control units 100 may be dispersed state-by-state, regionally, country-by-country, or other chosen geographical area.

The processing unit 40, which may be a personal computer or other computer, a server, a controller, or other device, or combinations and/or multiples thereof, receives the signal 35, such as data representing an analog and/or digital image, sent from the imaging device 30. The processing unit 40, may then automatically, manually, and/or selectively evaluate the data using an algorithm, or other evaluation technique, to analyze a parameter, such as the position of the brush 24, in order to determine a condition of the brush 24, such as the wear state (e.g., the current stage in the lifecycle of the brush 24), life expectancy (e.g., how long until the brush 24 needs to be replaced) and/or the wear rate (e.g., the change in length per unit of time) of a brush 24, for example, or others. In some embodiments, the processing unit 40 may include a monitor which may be used to display the analog and/or digital images received. The processing unit 40 may also be configured to inform a user of the states of the brush and/or alert, notify, schedule and/or advise maintenance, part delivery, on site inspection, and/or other task, shut down the system, and/or otherwise perform a consultative and/or responsive function in view of the determined condition of the brush 24.

The brush holder assembly 20, for example as shown in FIG. 1, may include a brush holder 22, such as a brush box, surrounding a brush 24 on several sides and including a plurality of guiding surfaces for guiding linear or longitudinal movement of the brush 24. In some embodiments, the brush holder 22 may not take on the form of a box, but may include one or a plurality of guiding surfaces, such as channels, posts or columns, abutting and/or encompassing one or more sides of the brush 24 and/or extending into or through the brush 24, or a portion thereof, for guiding linear or longitudinal movement of the brush 24.

The brush holder 22 may be secured to a mounting beam 26 configured and adapted to be mounted to another structure, such as a mounting block 70. The brush holder assembly 20 is configured to place the brush 24 in contact with a conductive surface 12, such as a rotating surface of a collector ring, a slip ring, or a commutator, and conduct current therefrom. The brush 24 may extend from the lower edge of the brush holder 22 such that a wear surface of the brush 24 engages the conductive surface 12. The mounting beam 26 may include an over-center engagement mechanism, a slotted or channeled engagement mechanism for sliding engagement, or other mechanism for easily engaging and disengaging the brush 24 from a conductive surface 12. In other embodiments, the brush holder assembly may include a brush holder rigidly mounted to another structure holding the brush holder stationary, or mounted to another structure in any desired arrangement. For example, in some embodiments the brush holder may be bolted or welded to a stationary structure. Some such brush holders are disclosed in U.S. Pat. Nos. 6,731,042; 5,753,992; 5,621,262; 5,463,264; 5,397,952; and 5,256,925; which are incorporated herein by reference.

As shown in FIG. 1, the mounting beam 26 may include an upper beam member 27 and a lower beam member 28 hingedly or pivotedly coupled to one another. When the upper beam member 27 and the lower beam member 28 are aligned with one another (e.g., the longitudinal axis of the upper beam member 27 is parallel with the longitudinal axis of the lower beam member 28), the brush holder 22 may be considered to be in an engaged, or locked, position such that the brush 24 may be contiguous with or in contact with the conductive surface 12. When the upper beam member 27 is tilted from the lower beam member 28 (e.g., the longitudinal axis of the upper beam member 27 is oblique to the longitudinal axis of the lower beam member 28), the brush holder 22 may be considered to be in a disengaged, or unlocked, position such that the brush 24 may be non-contiguous with, spaced from, or otherwise not in direct electrical contact with the conductive surface 12. The mounting beam 26 may be removably coupled to the mounting block 70 during operation. In some embodiments, the mounting beam 26 may slidably engage with, interlock with, or otherwise be removably coupled to the mounting block 70. The mounting block 70 may be coupled to, secured to, or otherwise extend from another structure which maintains the mounting block 70 stationary with respect to the conductive surface 12, for example.

In some embodiments, a handle 21 may be attached to the brush holder 22 to facilitate engagement and disengagement of the brush 24 from the conductive surface 12. For example, the handle 21 may be attached to the upper beam member 27 such that movement of the handle 21 actuates (e.g., pivots, slides, releases) the upper beam member 27 relative to the lower beam member 28. The handle 21 may be a removable handle or the handle 21 may be permanently attached to the upper beam member 27 or another portion of the brush holder 22.

Also illustrated in FIG. 1 is a brush spring 29, such as a constant force spring, which provides tension to the brush 24 to bias the brush 24 toward and in contact with the conductive surface 12. The spring 29 may be attached to a portion of the brush holder 22 or the mounting beam 26 of the brush holder assembly 20, for example. In some embodiments, the spring 29 may extend along one side surface of the brush 24 between the brush 24 and the mounting beam 26 of the brush holder assembly 20.

The brush holder assembly 20 may further include a marker 50. The marker 50 may be attached to, embedded in, in contact with, or otherwise track or follow the movement of the brush 24. Therefore, movement of the marker 50 may directly correspond to movement of the brush 24. For example, linear or longitudinal displacement of the marker 50 may be equivalent, or otherwise proportional, to the linear or longitudinal movement and/or diminution of the brush 24 as the brush 24 is worn.

The marker 50 may include one or more, or a plurality of, indicia or markings, or the like, that may aid in determining the position of the marker 50, and thus the position of the brush 24, as will be discussed hereafter. In some embodiments, the indicia or markings may provide a visual determination of the position of the marker 50, and thus the position of the brush 24. For example, the marker 50 may include one or a plurality of targets 52. Referring to FIG. 3A, in one embodiment, the marker 50 includes two targets 52, a baseline target 52a and a tracking target 52b spaced apart a predetermined distance and positioned on a first side surface of the marker 50. It is noted that in other embodiments, the marker 50 may include an alternative number and/or configuration of targets 52. For example, the marker 50 may only include one target 52 or the marker 50 may include three, four, or more targets 52 as desired. Each target 52 may be a mark, such as a black, red, white or other colored dot, an "X", crosshairs, or any other mark which may be readily identifiable and/or contrasted from the remainder of the marker 50 and/or surroundings. In some embodiments, the predetermined distance between the baseline target 52a and the tracking target 52b may be selected to correspond to the amount of wear (e.g., diminution in longitudinal length of a brush 24) desired prior to replacement of the brush 24. For example, the distance between the baseline target 52a and the tracking target 52b may be about 1, 1.5, 2, 2.5, 3 or more inches. However, it is noted that although some possible distances are identified, the predetermined distance between the baseline target 52a and the tracking target 52b can be any desired length.

The marker 50 may include a base portion 53 and a flag portion 54 extending from the base portion 53. The base portion 53 may include an engagement or interlocking portion 55 configured to interlock or otherwise engage with a complementary engagement or interlocking portion 25 of the brush 24. For example, the base portion 53 of the marker 50 may include a male or female interlocking portion, such as one or more grooves, channels, flanges, or tabs, which may be complementary to a female or male interlocking portion, such as one or more grooves, channels, flanges, or tabs, of the brush 24. Thus, the marker 50 may be reusable, such that the marker 50 may be separated from a worn brush 24 and repositioned on a replacement brush 24. In other embodiments, the marker 50 may be attached to the brush 24 by other means. For example, the base portion 53 may be bonded to, embedded in, fastened to, or otherwise attached to the brush 24. In some embodiments, the marker 50 may abut and track the movement of the brush 24 without being attached to the brush 24.

Additionally, the upper surface 56 of the base portion 53 may include a recess or channel 57 bordered by raised edges 58. The channel 57 and edges 58 are adapted to constrain the spring 29 during operation. As shown in FIG. 1, the spring 29 may rest on, compress against, couple to, or otherwise contact the upper surface 56 of the base portion 53 and be positioned between the edges 58. Thus, the base portion 53 may be interposed between the upper surface 56 of the brush 24 and the spring 29. The edges 58 may maintain the spring 29 in a desired position, such that the spring 29 does not move awry during operation.

In other embodiments, such as the embodiment illustrated in FIG. 3B, the marker 350 may include one or more, or a plurality of, graduation or tick marks 352 or other visual indicia. Other aspects of the marker 350 may be similar to those discussed above regarding the marker 50. Therefore, for the sake of repetitiveness, notable similarities will not be repeated. For example, the marker 350 may include a base portion 353 and a flag portion 354 extending from the base portion 353. In some embodiments, the base portion 353 may be configured to interlock or otherwise engage with a complementary engagement portion 25 of the brush 24. For example, the base portion 353 may include an engagement or interlocking portion 355. In some embodiments, the base portion 353 may include an upper surface 356, a channel 357 and/or one or more edges 358, similar to that of the marker 50.

In the embodiment illustrated in FIG. 3B, the flag portion 354 of the marker 350 may include one or more, or a plurality of, graduation or tick marks 352. The graduation or tick marks 352 may be spaced evenly, unevenly, incrementally, progressively or otherwise as desired along at least a portion of the marker 350. The graduation or tick marks 352 may be used to evaluate movement of the marker 350, and thus diminution of a brush 24, relative to a stationary position used as a reference point. For example, in some embodiments, the graduation or tick marks 352 on the marker 350 may be used as a ruler, a vernier scale, or similar measurement apparatus, or the like, in order to evaluate movement of the marker 350 relative to a stationary member and/or mark. The use of a vernier scale allows for more precise measurements than other measuring devices utilizing an equivalent quantity of markings which are evenly spaced. Further discussion of such an embodiment will be discussed later with reference to FIG. 10.

Figure 4:
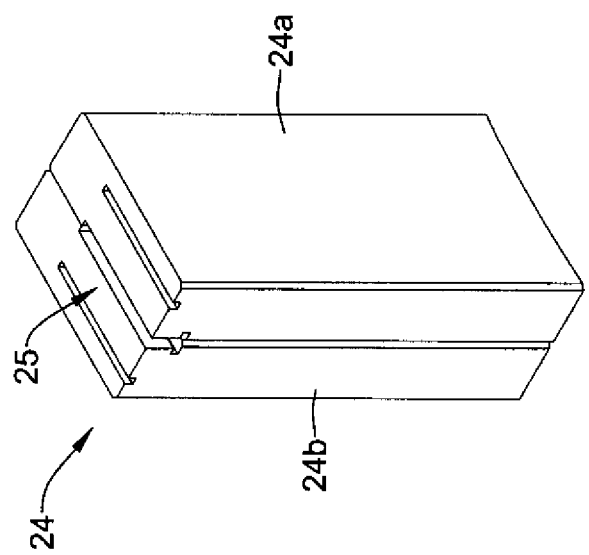
FIG. 4 is a perspective view of an illustrative brush for a brush holder assembly.

The brush 24, as shown in FIG. 4, may include a plurality of independent portions, such as two independent halves 24a, 24b, or the brush 24 may be a single member. The two independent halves 24a, 24b may be symmetrical or the two independent halves 24a, 24b may be asymmetrical in some embodiments. The brush 24 may include an engagement or interlocking portion 25, for example a female or male interlocking portion, such as one or more grooves, channels, flanges, or tabs, which may be complementary to a male or female interlocking portion, such as one or more grooves, channels, flanges, or tabs, of the marker 50. In some embodiments wherein the brush 24 includes two independent halves 24a, 24b, the engagement or interlocking portion 55 of the marker 50 may engage or interlock with the engagement or interlocking portion 25 of the brush 24 in order to couple or otherwise secure one half 24a of the brush 24 with the second half 24b. Thus, the base portion 53 of the marker 50 may restrain independent movement of the first half 24a of the brush 24 relative to the second half 24b.

Figure 5A:
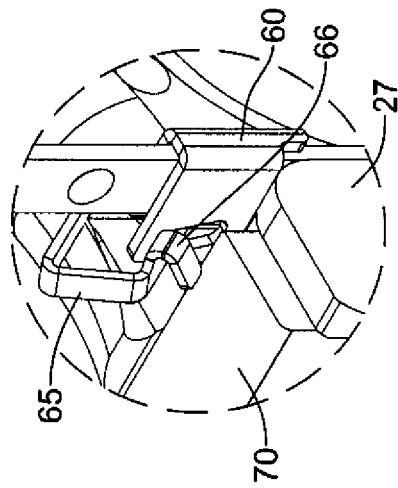
FIG. 5A is an enlarged view of the marker catch illustrated in FIG. 5.
Figure 5B:
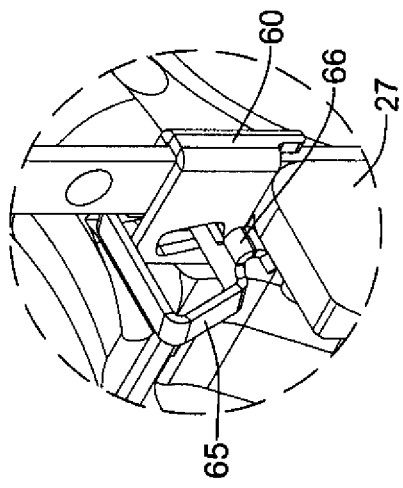
FIG. 5B is an enlarged view of the marker catch illustrated in FIG. 5 in an alternate position.
Figure 5:
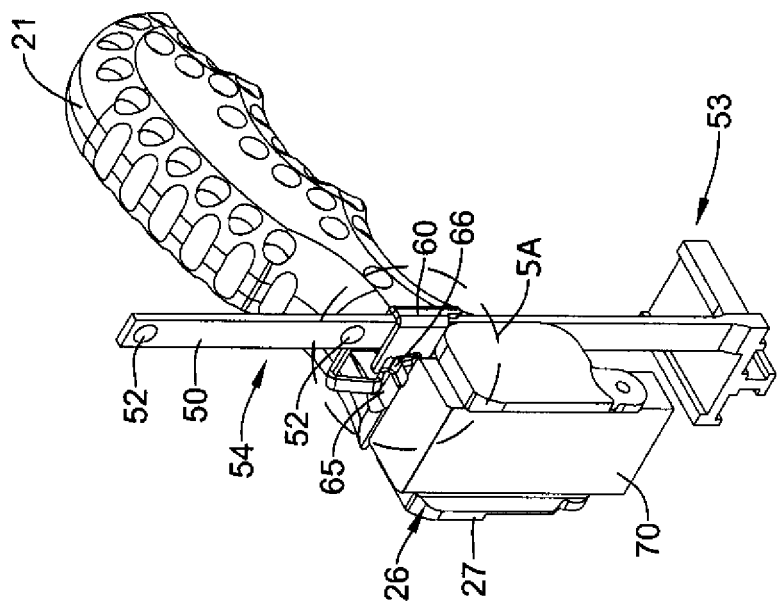
FIG. 5 is a perspective view of a partial assembly of a brush holder assembly including a marker.

A partial assembly of the marker 50 in the brush holder assembly 20 is illustrated in FIG. 5. A portion of the marker 50, such as the flag portion 54, may extend through a marker guide 60. In some embodiments, a portion of the marker guide 60, or an extension of the marker guide 60 may be used as a stationary part for referencing relative displacement of the marker 50. The marker guide 60 may be attached to the handle 21, the mounting beam 26 (e.g., the upper mounting beam 27 or lower mounting beam 28), or other structure of the brush holder assembly 20. The marker guide 60 provides a sliding surface and/or conduit for guiding the marker 50 in a longitudinal direction.

The marker guide 60 may also include a marker catch 65. The marker catch 65 may be movable between an engaged position and a disengaged position for selectively engaging and disengaging with the marker 50. In some embodiments, the marker catch 65 may be formed of a resilient material such as a polymeric material or a metallic material such as copper, allowing the marker catch 65 to be deflected from an equilibrium position when subjected to an external force, yet returning to the equilibrium position once the external force is removed. In other embodiments, the marker catch 65 may include a spring member providing means for returning the marker catch 65 to an initial position after being urged into another position.

FIG. 5A is an enlarged view showing the brush holder assembly 20 engaged with the mounting block 70, in which the marker catch 65 is in a disengaged position, and FIG. 5B is an enlarged view showing the brush holder assembly 20 disengaged with and/or removed from the mounting block 70 in which the marker catch 65 is in an engaged position. When the brush holder 22 is in the engaged position (e.g., the brush 24 is in contact with the conductive surface 12), the marker catch 65 may be disengaged from the marker 50, allowing for free longitudinal movement of the marker 50 through the marker guide 60. When the brush holder 22 is in the disengaged position (e.g., the brush 24 is not in contact with the conductive surface 12), the marker catch 65 may be engaged with the marker 50, restricting or preventing longitudinal movement of the marker 50 through the marker guide 60. For example, the marker catch 65 may slide, deflect or rotate such that an edge of the marker catch 65 contacts a side of the marker 50. When the marker catch 65 is engaged with the marker 50, which in turn is attached to the brush 24, the marker catch 65 impedes or prevents longitudinal movement of the marker 50 relative to the marker catch 65. When the brush holder 22 is disengaged and/or removed from the mounting block 70, the brush 24 is not constrained against the conductive surface 12. Thus, the biasing force of the spring 29 has a tendency of expelling the brush 24 out the open end of the brush holder 22 opposite the spring 29. Therefore, when the marker catch 65 is engaged with the marker 50, the marker catch 65 retains the brush 24 in the brush holder 22; thus, countering the biasing force of the spring 29 from ejecting the brush 24 from the brush holder 22.

In the embodiment shown in FIG. 5, the marker catch 65 is actuated by the tab 66. However, in other embodiments, other means of actuating the marker catch 65 may be implemented. When the brush holder assembly 20 is in the engaged position as shown in FIG. 5A, the tab 66 may contact the mounting block 70 disposed in the recessed portion or channel of the mounting beam 26 (upper portion 27 shown), thus actuating the marker catch 65 to be disengaged from the marker 50. The mounting block 70 may disengage the marker catch 65 from the marker 50 by urging or deflecting the marker catch 65, which is biased to engage the marker 50, up and/or away from the marker 50. When the brush holder 22 is in the disengaged position as shown in FIG. 5B, the tab 66 may be released from or not in contact with the mounting block 70 (as the mounting block 70 is dissociated from the recessed portion or channel of the mounting beam 26 (upper portion 27 shown), thus permitting the marker catch 65, which is biased to engage the marker 50, to be engaged with the marker 50. As the mounting block 70 is no longer inhibiting the marker catch 65 from engaging the marker 50, the marker catch 65, attempting to reach its equilibrium position, contacts the marker 50. It is noted that in other embodiments, the marker catch 65 may be actuated in another fashion. In some embodiments, the marker 50 may include a textured, knurled, or serrated surface, or similar surface having a high coefficient of friction, which, when engaged with the marker catch 65, provides additional purchase between the marker 50 and the marker catch 65. In other embodiments, the marker 50 and/or the attached brush 24 may be selectively retained to prevent the biasing force of the spring 29 from ejecting the brush 24 from the brush holder 22 independent of whether or not the brush holder 22 is in an engaged position (e.g., the brush 24 is in contact with the conductive surface 12) or a disengaged position (e.g., the brush 24 is not in contact with the conductive surface 12). In other words, in other embodiments the marker catch 65 may be selectively actuated into contact and/or out of contact with the marker 50 and/or the brush 24 regardless of whether the brush holder assembly 20 is engaged or disengaged with the mounting block 70. Thus, manipulation of the marker catch 65 into contact with the marker 50 may prevent longitudinal movement of the brush 24 within the brush holder 22, and/or manipulation of the marker catch 65 out of contact with the marker 50 may allow longitudinal movement of the brush 24 within the brush holder 22.

Processing and/or evaluation of the signal by the processing unit 40 may include an image analysis technique, such as a pixel-by-pixel comparison, for example. However, other techniques may be used in processing and/or evaluation of data acquired. Pixel-by-pixel comparison involves comparing a first digital image with a second, or subsequent, digital image. It is noted that in using the terms "first" and "second", the terms are intended to denote the relative temporal relationship of the images only. An algorithm, for example, may be used to systematically compare data denoting pixels of one digital image with data denoting pixels of a second digital image. A pixel is the smallest independent part of a digital image and may have the properties of color, shade and/or intensity. The resolution of the digital image is determined by the quantity of pixels creating the digital image (e.g., the greater the number of pixels, the greater the resolution of the digital image). A digital image is characterized as an array of pixels. The digital image may be divided into any sized array and may be dictated by the quality of imaging equipment and/or memory available. For example, the digital image may be an 800×600, 1024×768, or 1600×1200 array of pixels. Each pixel is identified by an integer denoting the value (e.g., color, shade and/or intensity) of the individual pixel. For example, each pixel may be specified by a "0" or a "1" denoting black or white respectively; or an integer between 0 and 255 denoting 256 shades of grey; or three integers between 0 and 255 each denoting a red, blue and green component, respectively with 256 levels for each component; or an integer between 0 and 1023 denoting 1024 infra-red levels, or other identifiable values. Thus, the color, shade and/or intensity of each pixel may be denoted by a representative integer. It may be understood that the digital identification of each pixel may be determined by the number of bits available for data regarding each pixel.

Figure 6:
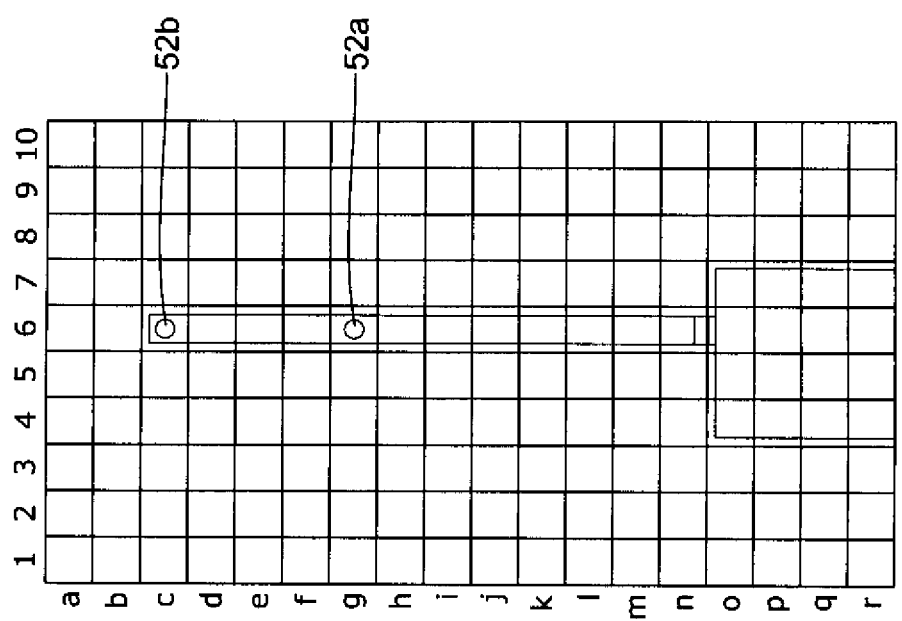
FIG. 6 is an illustrative representation of an array of pixels overlaying a plan view of a brush holder assembly including a marker.

FIG. 6 shows an exemplary grid of pixels overlaying a plan view (analog image) of a portion of the brush 24 and marker 50 of a brush holder assembly 20. In creating a digital image, the value of each pixel representative of the corresponding portion of an analog image must be determined. For example, as shown in FIG. 6, the pixel at row c, column 6, P(c, 6), will have a value representative of the tracking target 52b, and the pixel at row g, column 6, P(g, 6), will have a value representative of the baseline target 52a. Other pixels will have values representative to corresponding portions of an analog image.

Figure 7:
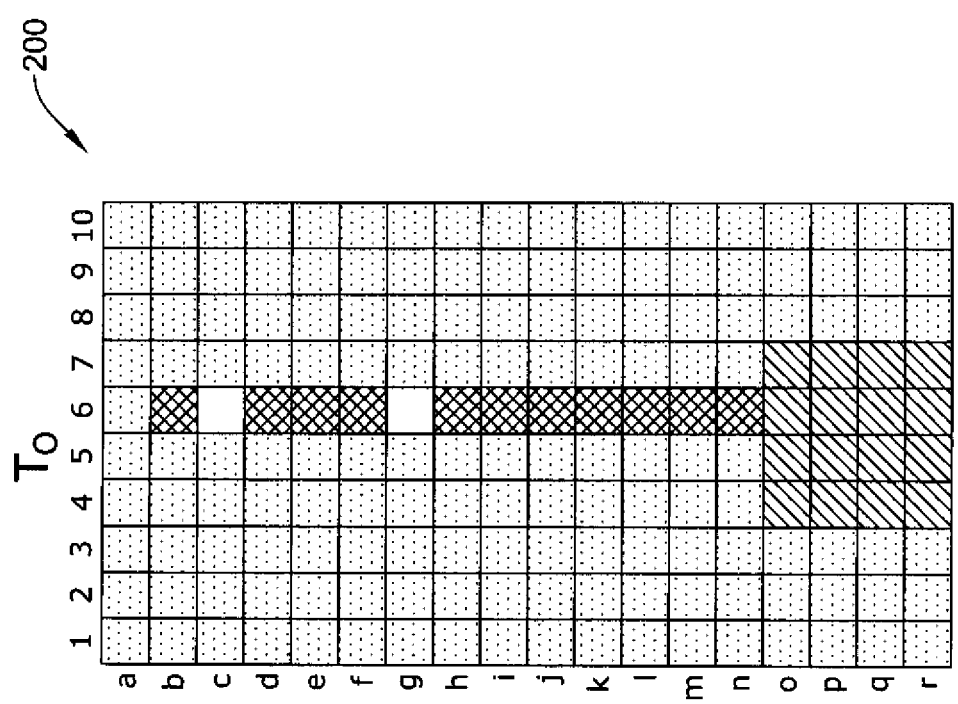
FIG. 7 is an illustrative representation of a digital image of a marker of a brush holder assembly taken at time, $T_O$.

FIG. 7 illustrates an exemplary digital image 200 of a marker 50 at an initial time, $T_0$. The digital image 200 is divided into an array of pixels. As shown, the digital image 200 is divided into an 18×10 array of pixels. However, it is noted that the digital image 200 is for illustrative purposes only, and that a digital image may include a much larger array of pixels resulting in a digital image having a higher resolution. As shown in FIG. 7, the pixel at row g, column 6, P(g, 6), of the digital image 200 corresponds to the baseline target 52a and the pixel at row c, column 6, P(c, 6), of the digital image 200 corresponds to the tracking target 52b. It is noted that in digital images having a higher resolution (e.g. more pixels per unit area), the baseline target 52a and/or the tracking target 52b may correspond to a plurality or cluster of pixels.

Figure 8:
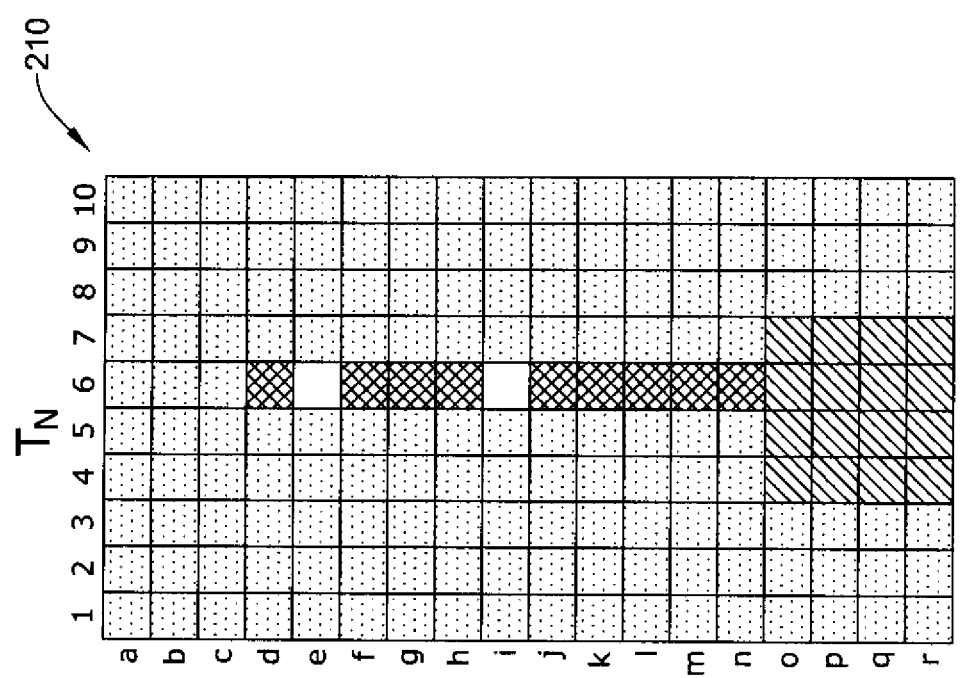
FIG. 8 is an illustrative representation of a digital image of a marker of a brush holder assembly taken at time, $T_N$.

Additional digital images may be taken of the marker 50 at successive times as desired to conduct a comparative analysis. FIG. 8 illustrates a second exemplary digital image 210 of a marker 50 at a later time, $T_N$. Similar to the first exemplary digital image 200, the digital image 210 is divided into an 18×10 array of pixels. As shown in FIG. 8, the position of the targets 52 has moved, corresponding to wear of the brush 24 and thus linear displacement of the brush 24. The pixel at row i, column 6, P(i, 6), of the digital image 210 now corresponds to the baseline target 52a and the pixel at row e, column 6, P(e, 6), of the digital image 210 now corresponds to the tracking target 52b.

Figure 9:
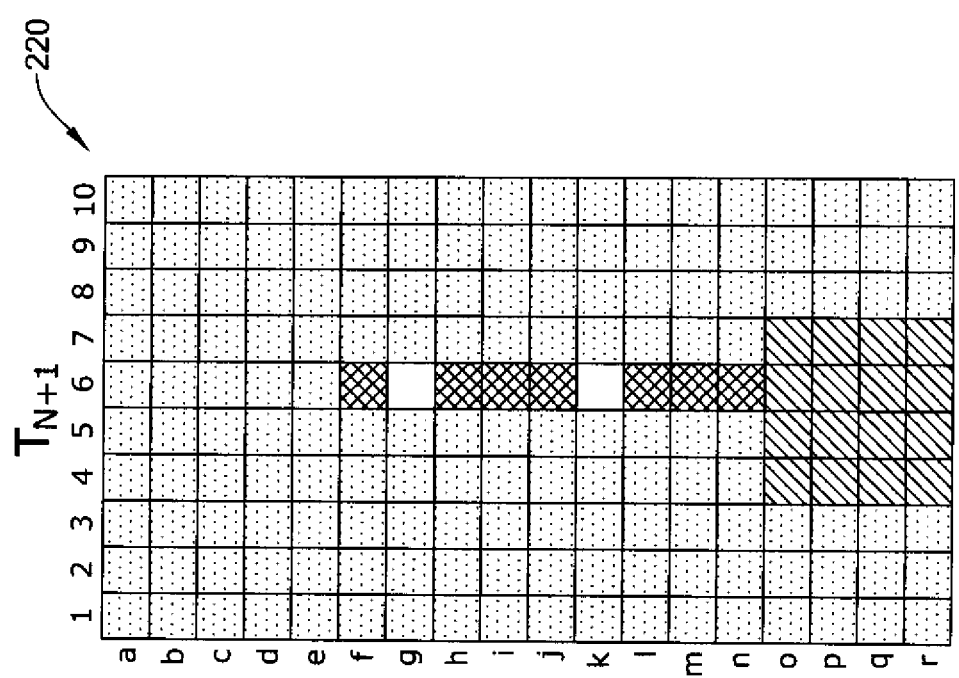
FIG. 9 is an illustrative representation of a digital image of a marker of a brush holder assembly taken at time, $T_{N+1}$.

FIG. 9 illustrates a third exemplary digital image 220 of a marker 50, divided into an 18×10 array of pixels, taken at a subsequent time, $T_{N+1}$. As shown in FIG. 9, the position of the targets 52 has again moved, corresponding to additional wear of the brush 24 and thus further linear displacement of the brush 24. The pixel at row k, column 6, P(k, 6) of the digital image 220 now corresponds to the baseline target 52a and the pixel at row g, column 6, P(g, 6), of the digital image 220 now corresponds to the tracking target 52b. A comparative analysis of the digital images 200, 210, 220 may be performed as desired. It is noted that in the digital image 220, the tracking target 52b (corresponding to pixel, P(g, 6)) at time, $T_{N+1}$, is positioned at the initial position of the baseline target 52a (corresponding to pixel, P(g, 6)) as shown in the digital image 200 taken at time, $T_0$. As discussed later, in some embodiments, notification for replacement of the brush 24 may be prompted when the tracking target 52b reaches the initial position of the baseline target 52a as shown in FIG. 9.

The processing unit 40 may be able to distinguish the pixels corresponding to the targets 52 from the remainder of the pixels of the digital images 200, 210, 220. By maintaining the same viewpoint of each of the digital images 200, 210, 220, in some embodiments, other nonmoving elements represented in the digital images appear unmoved and thus the value (e.g., color, shade and/or intensity) of the corresponding pixels of the digital images 200, 210, 220 may be unaltered. In some embodiments, the processing unit 40 recognizes the known value of pixels corresponding to the targets 52. Thus, evaluation of the digital images 200, 210, 220 may involve assessing the relative position of pixels of the digital images 200, 210, 220 corresponding to the targets 52.

Although only one marker 50 having two targets 52 is depicted in the digital images 200, 210, 220, it is contemplated that a single digital image may include pixels corresponding to targets of multiple markers tracking movement of multiple brushes simultaneously. Thus, the processing unit 40 may be able to differentiate between pixels corresponding to a first marker tracking movement of a first brush from pixels corresponding to second marker tracking movement of a second brush.

A software program may be used to evaluate the digital images 200, 210, 220. Thus, a software program may identify relative displacement of the targets 52 by determining the coordinates of the pixels corresponding to the targets 52. For example, initially a software program may process and evaluate an initial digital image 200 capturing the initial position of the targets 52 in order to determine and store the initial positions of the targets 52 identified in the digital image 200 at time, $T_0$. For example, the initial position at $T_0$ of the baseline target 52*a* may be determined and stored, providing a reference point for determining the threshold position of the tracking target 52*b* corresponding to a threshold level of wear of the brush 24 before prompting replacement of the brush 24. For example, the software program may identify and save the coordinates (e.g., row, column) of the pixel(s) representing the position of the baseline target 52*a*. The software program may identify the pixel(s) corresponding to the baseline target 52*a* by evaluating the value (e.g., color, shade and/or intensity) of pixel(s) relative to adjacent pixels of the digital image 200. The pixel(s) corresponding to the baseline target 52*a* may have a contrasting value from adjacent pixels of the digital image 200. For example, as shown in FIG. 7, the pixel corresponding to the baseline target 52*a* may be white and surrounding pixels may be a color, shade or intensity other than white. A distinct difference in value (e.g., color, shade and/or intensity) of a pixel relative to adjacent pixels may be indicative of the baseline target 52*a*. In other embodiments, the software program may identify and determine the initial position of the targets 52 using alternative evaluation techniques, such as evaluating individual pixels to determine pixels having a programmed, predetermined identifiable value corresponding to the targets 52.

Additionally or alternatively, the initial position of the tracking target 52*b* at time, $T_0$ may be determined and stored, providing a reference point for determining the initial position of the tracking target 52*b*. The software program may identify the pixel(s) corresponding to the tracking target 52*b* by evaluating the value (e.g., color, shade and/or intensity) of pixel(s) relative to adjacent pixels of the digital image 200. The pixel(s) corresponding to the tracking target 52*b* may have a contrasting value from adjacent pixels of the digital image 200. For example, as shown in FIG. 7, the pixel corresponding to the tracking target 52*b* may be white and surrounding pixels may be a color, shade or intensity other than white. A distinct difference in value (e.g., color, shade and/or intensity) of a pixel relative to adjacent pixels may be indicative of the tracking target 52*b*. Thus, the software program may identify the contrasting value (e.g., color, shade and/or intensity) of a pixel relative to adjacent pixels in identifying the position of the tracking target 52*b*. For example, the software program may identify and save the coordinates (e.g., row, column) of the pixel(s) representing the position of the tracking target 52*b*. In other embodiments, the software program may identify and determine the initial position of the targets 52 using alternative evaluation techniques, such as evaluating individual pixels to determine pixels having a programmed, predetermined identifiable value corresponding to the targets 52.

Therefore, the targets 52 may be chosen to contrast the remainder of the surroundings captured in the digital image 200. For example, the targets 52 may be chosen as relatively brighter components or components having a dissimilar color than the other components of the digital image 200. The software program may systematically evaluate the pixels of the digital image 200. For example, the software program may use a subroutine to determine the value (e.g., color, shade and/or intensity) of each pixel, P(row, column), corresponding to the array of pixels having a plurality of rows and a plurality of columns forming the digital image 200. The software program, which may identify the brighter components or components having a programmed, predetermined color, shade or intensity (e.g. the targets 52) of the digital image 200 from the other components, may determine the relative location of brighter components or components having a programmed, predetermined color, shade or intensity (e.g., the targets 52) of the digital image. Thus, the software program may evaluate the color, shade and/or intensity of the pixels of the digital image 200 in order to determine and/or store the location of the targets 52. In other embodiments, the software program may be configured to use other techniques to identify/recognize the targets 52.

At a subsequent time, a second signal corresponding to the second digital image 210 may be sent or transmitted to the processing unit 40 and processed and/or evaluated with the software program. For example, the software program may process and/or evaluate the digital image 210 to determine the relative position of one or more of the targets 52 at time, $T_N$. In evaluating the position of the targets(s) 52 at time, $T_N$, the software program may evaluate the pixels of the digital image 210, similar to that described above regarding the evaluation of the digital image 200. Thus, the software program may identify and/or store the position of the target(s) at time, $T_N$.

Additional signals (e.g., digital images) may be sent or transmitted to the processing unit 40 at subsequent times. The software program may continue to process and/or evaluate additional signals corresponding to additional digital images taken of the marker 50 and/or brush holder assembly 20. For example, the software program may process and/or evaluate the digital image 220 to determine the relative position of one or more of the targets 52 at time, $T_{N+1}$. In evaluating the position of the targets(s) 52 at time, $T_{N+1}$, the software program may evaluate the pixels of the digital image 220, similar to that described above regarding the evaluation of the digital image 200. Thus, the software program may identify and/or store the position of the target(s) at time, $T_{N+1}$.

The software program may evaluate the position of the targets 52 in order to determine the relative displacement of the brush 24. For example, the specified number of pixels of a digital image 200, 210, 220 which equates to a determined linear distance may be input into, computed by, or otherwise provided to the software program. For instance, in the digital images 200, 210, 220, five pixels may equate to one inch. Thus, movement of a target 52 five pixels equates to movement of the marker 50 (and thus the brush 24) a linear distance of one inch. It is noted that these numbers are for illustrative purposes only, and one inch of linear displacement of the brush 24 may correlate to movement of a target 52 any determined quantity of pixels of a digital image, as determined for individual applications. In some embodiments, the software program, having input or otherwise programmed the known distance between two targets 52 and determining the pixel coordinates of the targets 52, may analyze and compute the number of pixels per unit of linear distance that the digital image corresponds to. The computed pixels per unit of linear distance may be used in further evaluation of the change in coordinates of pixels representing the targets 52 in order to determine displacement of the targets 52.

The software program may utilize the position of the targets 52 in evaluating a condition of the brush 24. For instance, the software program, in determining the present position of the tracking target 52*b* relative to a previous position of the tracking target 52*b* (e.g., comparing the position of the tracking target 52*b* in the digital image 220 relative to the position of the tracking target 52*b* in the digital image 210), may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24. For example, the software program may compute the change in position of the tracking target 52*b*, which corresponds to the linear displacement of the brush 24. For instance, the software program may determine the number of pixels the tracking target 52*b* moved between the digital image 210 and the digital image 220. Thus, the software program may compute the linear displacement of the tracking target 52*b*, and thus the linear diminution of the brush 24, during the time interval between the digital image 210 and the digital image 220. Knowing the time interval between the evaluated digital images (e.g., the elapsed time between the digital image 210 and the digital image 220), the software program may compute the wear rate of the brush 24. The software program may evaluate the present wear rate of the brush 24 with prior wear rates or modeled wear rates of the brush 24 in order to determine a projected wear rate of the brush 24 or other projected brush conditions, such as life expectancy of the brush 24.

Additionally or alternatively, the software program may compare the present position of the tracking target 52*b* (e.g., the position of the tracking target 52*b* at time, $T_{N+1}$) with the initial position of the baseline target 52*a* at time, $T_0$. By comparing the present position of the tracking target 52*b* with the initial position of the baseline target 52*a*, the software program may determine and/or evaluate positional characteristics of the brush 24. Thus, the software program may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24. For example, in some embodiments, the software program, knowing the threshold displacement of the tracking target 52*b* as indicated by the initial position of the baseline target 52*a*, may assess the present wear state of the brush 24 with the current or projected wear rate of the brush 24 in order to compute the life expectancy of the brush 24.

Additional signals or digital images may be repeatedly sent from the imaging device 30 to the processing unit 40 continuously, at programmed, predetermined time intervals, at intermittent times, or additional signals or digital images may be sent from the imaging device 30 to the processing unit 40 at subsequent manually determined times, for example. Thus, data from the subsequently sent digital images may be likewise evaluated by the software program.

In some embodiments, the software program may compile relevant information from a plurality of digital images taken over a period of time in order to chart the movement of the targets 52, and thus the movement of the brush 24, over a time interval. In some embodiments, the software program may output the data compiled from evaluating the digital images in charts, graphs, tables, displays, monitors, or other forms of presenting compiled information. For example, the software program may output a graph of the wear rate, wear state, and/or life expectancy of the brush 24. In some embodiments, the software program may output/display a projected temporal occasion, such as date and/or time, corresponding to when the brush 24 is expected to surpass a threshold amount of wear and/or needs to be replaced. Therefore, the projected date and/or time may be used to schedule replacement of the brush 24 and/or other maintenance or inspection of the electrical equipment. Thus, the software program of the processing unit 40 may determine an estimated projection of a future condition of the brush 24.

In some embodiments, the software program may use modeled conditions or modeled brush wear data provided or input into the software program in order to evaluate and/or analyze a current and/or projected condition of the brush 24. For example, a modeled wear rate of a brush and/or a modeled life expectancy of a brush may be provided or input into the software program. The software program may then compare the modeled data with actual data of the brush 24 sent to the software program in order to predict or determine an estimated projection of a condition of the brush 24 into the future. Thus, the temporal occasion of surpassing a threshold condition of the brush 24, such as the moment when the desired diminution of the brush prior to replacement of the brush is reached at a future date, may be predicted, for example. Desired notification and/or scheduling tasks may be performed in view of the projected conditions of the brush 24.

When the software program determines that a parameter, such as the threshold wear of the brush 24 has been met or is projected to be met at a future temporal occasion, the software program may output a signal. In some embodiments, the signal may alert an operator, technician and/or other personnel that the brush 24 is sufficiently worn and/or needs to be replaced, the brush 24 is damaged, failure has occurred or is imminent, or other maintenance or inspection may need to be performed. In some embodiments, the output signal from the processing unit 40 or a technician may schedule maintenance or inspection, send personnel to perform maintenance or inspection, order and/or schedule distribution/delivery of a replacement brush 24 or other part, route maintenance personnel and/or product delivery to a specified location, or arrange for other notification and/or scheduling tasks be performed.

The monitoring system 10 may also be used to identify and/or notify other key maintenance, failure of the brush holder assembly 20 and/or other anomalous conditions. For example, incidents of excess heating, arcing or excess vibration, which may indicate a need to perform maintenance and/or disrupt operation of the electrical equipment, may be identified and/or assessed with the monitoring system 10. The software program may carry out an appropriate response to respond to the anomalous condition identified by the software program in an attempt to rectify the anomalous condition. In other embodiments, an operator may carry out an appropriate response to respond to an anomalous condition identified with the monitoring system 10 in an attempt to rectify the anomalous condition.

The same imaging device 30 or additional imaging devices may be used to view and/or store video or images of maintenance activities as well as scheduled or unscheduled intrusions of the equipment by personnel. This acquired data may be reviewed to help determine possible causes of anomalous functioning or failure of the equipment and/or help assess timing of events that may occur.

Figure 10:
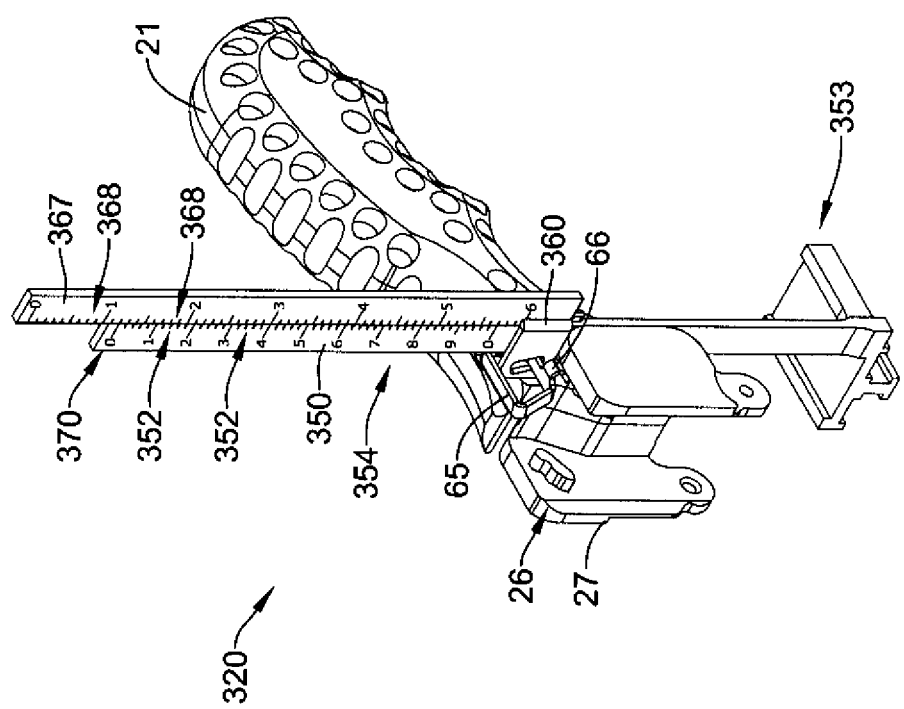
FIG. 10 is a perspective view of a partial assembly of an alternate brush holder assembly including a marker.
Figure 14:
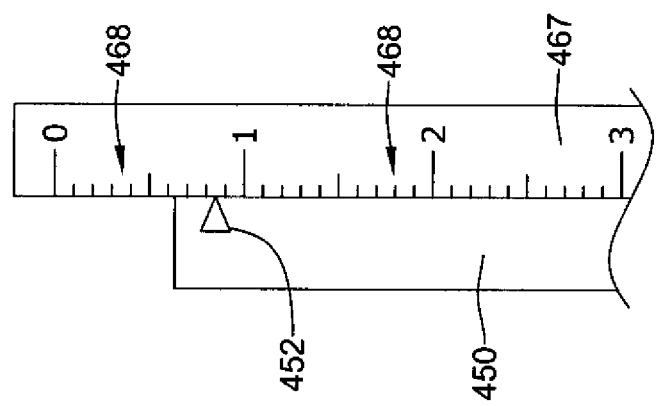
FIG. 14 is an illustrative representation of an image of yet another exemplary marker of a brush holder assembly.

FIG. 10 depicts an illustrative embodiment of a portion of a brush holder assembly 320, utilizing the marker 350 shown in FIG. 3B. The marker 350 includes incremental graduation or tick marks 352 for use as a vernier scale including the zero point 370. In the illustrative embodiment, an extension 367 extends parallel to and adjacent the marker 350. The extension 367, may be attached to, or otherwise extend from the marker guide 360, as illustrated in FIG. 10. However, in other embodiments, the extension 367 may be attached to, or otherwise extend from another portion of the brush holder assembly 320, which is stationary relative to the brush (not shown). The extension 367 may include a plurality of graduation or tick marks 368 which may be complementary to the graduation or tick marks 352 of the marker 350. If used as a vernier scale, the extension 367 may be considered the "fixed scale" (i.e., scale) and the marker 350 may be considered the "sliding scale" (i.e., vernier). However, in other embodiments, the designation of the two components of a vernier scale (i.e., the placement of the markings on the fixed scale and the placement of the markings on the sliding scale) may be reversed. When used as a vernier scale, the spacing between graduation or tick marks 352 along the "sliding scale" is slightly smaller than the spacing between graduation or tick marks 368 along the "fixed scale". For example, the "sliding scale" could have ten gradations extending the same length as nine gradations of the "fixed scale". The ratio (10:9) of gradations along the "sliding scale" to the gradations along the "fixed scale" may allow for unambiguous interpolation of measurements between markings on the "fixed scale". Although a vernier scale is illustrated in FIG. 10, one of skill in the art, incited by the present disclosure, would understand other measurement systems and/or other arrangements of graduation or tick marks which may be utilized to precisely measure movement (e.g., diminution) of the brush 24. For example, in some embodiments a measurement device having equidistant or incremental graduation or tick marks may be used in conjunction with an indicator or "zero" reference point, as shown in FIG. 14.

Processing and/or evaluation of the state of the brush, with or without the aid of a processing unit 40, using the graduated or tick marks 352 of the marker 350 may include an image analysis technique, such as pixel-by-pixel comparison, analog or digital visualization or monitoring such as on an image display, or manual observation, for example. However, other techniques may be used in processing and/or evaluation of data acquired. In some embodiments, a software program may be used to evaluate digital images taken of the marker 350 at select moments in time. Thus, a software program may identify the state of the brush by determining the displacement of the brush by evaluating measurements utilizing the graduated or tick marks 352 of the marker 350. In other embodiments, a visual inspection, with or without the aid of a monitor, of the position of the marker 350 of the brush holder assembly 320 may be used to evaluate the state of the brush.

In instances wherein a software program is used, the software program may compare data acquired from multiple successive temporal occasions, as desired, to conduct a comparative analysis. In other instances, a comparative analysis may be conducted through visual inspection of the movement of the marker 350 relative to the extension 367. For instance, FIG. 11 illustrates an exemplary image of the marker 350 and extension 367 at an initial time, $T_0$. At initial time, $T_0$, the scale may be set to zero, as illustrated as the zero point 370 is at "zero". However, in other embodiments, the initial reading, which need not be at the "zero" point on the scale, may be taken and used as a basepoint for subsequent measurements. FIG. 12 illustrates a second exemplary image of the marker 350 and extension 367 at a later time, $T_N$. As shown in FIG. 12, the position of the marker 350 relative to the extension 367 has moved (translation of the zero point 370), corresponding to wear of the brush 24 and thus linear displacement of the brush 24. FIG. 13 illustrates a third exemplary image of the marker 350 and extension 367 at a subsequent time, $T_{N+1}$. As shown in FIG. 13, the position of the marker 350 relative to the extension 367 has again moved (additional translation of the zero point 370), corresponding to additional wear of the brush 24 and thus further linear displacement of the brush 24. Thus, a comparative analysis of the position of the marker 350 relative to the extension 267 at a point in time may be performed as desired.

The processing unit 40, if used, may be able to distinguish pixels of a digital image taken of the marker 350 and extension 367 corresponding to the graduation or tick marks 352, 368 of the measurement device. In some embodiments, the processing unit 40 recognizes the known value of pixels corresponding to the graduation or tick marks 352, 368. Thus, evaluation of images of the marker 350 and extension 367 may involve assessing the relative position of pixels of the images, corresponding to the graduation or tick marks 352, 268. For example, the software program may be able to identify the location of the zero point 370 along the "fixed scale" of the extension 367, as well as which tick mark 352 of the "sliding scale" of the marker 350 is aligned with a tick mark 368 of the "fixed scale" of the extension 367. Upon evaluating these values, an accurate measurement may be determined. Thus, the processing unit 40, using an imagery technique, may determine the precise measurement indicated by the measuring device, which, in the illustrative embodiment is a vernier scale.

The processing unit 40 may use a software program to evaluate and/or assess the data provided. Thus, the software program may identify relative displacement of the marker 350 relative to the extension 367 by determining the relative position of the graduation or tick marks 352, 368. For example, initially a software program may process and evaluate a signal of an initial image capturing the initial position of the graduation or tick marks 352, 368 of the measuring device at time, $T_0$. For example, the measurement taken at the initial position at $T_0$ may be determined and stored, providing a reference point for subsequent measurements. A pixel-by-pixel comparison technique, as described above, or other imagery technique, may be used to accurately determine the measurement taken at the initial position at time, $T_0$. In other embodiments, the software program may identify and determine the initial position of the marker 350 relative to the extension 367 using alternative evaluation techniques, as known in the art.

At a subsequent time, a second signal corresponding to a second image may be sent or transmitted to the processing unit 40 and processed or evaluated with the software program. For example, the software program may process and/or evaluate an image capturing the position of the graduation or tick marks 352, 268 of the measuring device at time, $T_N$. In evaluating the position of the marker 350 relative to the extension 367 at time, $T_N$, the software program may evaluate the pixels of a digital image similar to that described above. Thus, the software program may identify and/or store the position of the marker 350 relative to the extension 367 at time, $T_N$.

Additional signals (e.g., digital images) may be sent or transmitted to the processing unit 40 at subsequent times. The software program may continue to process and/or evaluate additional signals corresponding to additional digital images taken of the marker 350 and extension 367 and/or the brush holder assembly 320. For example, the software program may process and/or evaluate an image capturing the position of the graduation marks 352, 368 of the measuring device at time, $T_{N+1}$. In evaluating the position of the marker 350 relative to the extension 367 at time, $T_{N+1}$, the software program may evaluate the pixels of a digital image similar to that described above. Thus, the software program may identify and/or store the position of the marker 350 relative to the extension 367 at time, $T_{N+1}$.

The software program may utilize the position of the marker 350 relative to the extension 367 in evaluating a condition of the brush 24. For instance, the software program, in determining the present measurement of the measuring device (and thus relative position of the marker 350 relative to the extension 367) relative to a previous measurement of the measuring device (and thus relative position of the marker 350 relative to the extension 367), may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24. For example, the software program may compute the change in position of the marker 350 relative to the extension 367, which may correspond to the linear displacement of the brush 24. Thus, the software program may compute the amount of wear (e.g., linear diminution) of the brush 24, during a specified time interval. Knowing the time interval between the evaluated images (e.g., the elapsed time between a first digital image and a second digital image), the software program may compute the wear rate of the brush 24. The software program may evaluate the present wear rate of the brush 24 with prior wear rates or modeled wear rates of the brush 24 in order to determine a projected wear rate of the brush 24 or other projected brush conditions, such as the life expectancy of the brush 24.

Additionally or alternatively, the software program may compare the present measurement of the measuring device with an inputted, stored or otherwise provided threshold measurement. By comparing the present measurement of the measuring device with a threshold measurement, the software program may determine and/or evaluate positional characteristics of the brush 24. Thus, the software program may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24. For example, in some embodiments, the software program, knowing the threshold measurement for displacement of the brush 24, may assess the present wear state of the brush 24 with the current or projected wear rate of the brush 24 in order to compute the life expectancy of the brush 24.

Additional signals or images may be repeatedly sent from the imaging device 30 to the processing unit 40 continuously, at programmed, predetermined time intervals, at intermittent times, or additional signals or images may be sent from the imaging device 30 to the processing unit 40 at subsequent manually determined times, for example. Thus, data from the subsequently sent images may be likewise evaluated by the software program.

In some embodiments, the software program may compile relevant information from data taken over a period of time in order to chart the movement of the marker 350, and thus the movement of the brush 24, over a time interval. In some embodiments, the software program may output the data compiled from evaluating the data in charts, graphs, tables, displays, monitors, or other forms of presenting compiled information. For example, the software program may output a graph of the wear rate, wear state, or life expectancy of the brush 24. In some embodiments, the software program may output/display a projected temporal occasion, such as date and/or time, corresponding to when the brush 24 is expected to surpass a threshold amount of wear and/or needs to be replaced. Thus, the projected date and/or time may be used to schedule replacement of the brush 24 and/or other maintenance or inspection of the electrical equipment. Thus, the software program of the processing unit 40 may determine an estimated projection of a future condition of the brush 24.

In some embodiments, the software program may use modeled conditions or modeled brush wear data provided or input into the software program in order to evaluate and/or analyze a current and/or projected condition of the brush 24. For example, a modeled wear rate of a brush and/or a modeled life expectancy of a brush may be provided or input into the software program. The software program may then compare the modeled data with actual data of the brush 24 sent to the software program in order to predict or determine an estimated projection of a condition of the brush 24 into the future. Thus, the temporal occasion of surpassing a threshold condition of the brush 24, such as the moment when the desired diminution of the brush prior to replacement of the brush is reached at a future date, may be predicted, for example. Desired notification and/or scheduling tasks may be performed in view of the projected conditions of the brush 24.

When the software program determines that a parameter, such as the threshold wear of the brush 24 has been met, the software program may output a signal. In some embodiments, the signal may alert an operator, technician and/or other personnel that the brush 24 is sufficiently worn and/or needs to be replaced, the brush 24 is damaged, failure has occurred or is imminent, or other maintenance or inspection may need to be performed. In some embodiments, the output signal from the processing unit 40 or a technician may schedule maintenance or inspection, send personnel to perform maintenance or inspection, order and/or schedule distribution/delivery of a replacement brush 24 or other part, route maintenance personnel and/or product delivery to a specified location, or arrange for other notification and/or scheduling tasks be performed.

In other embodiments, the monitoring system 10 may send or transmit a signal (e.g., an analog or digital image) from the imaging device 30 to the processing unit 40 where the brush holder assembly 320, including the position of the marker 350, may be monitored on a display. Thus, the brush holder assembly 320 may be monitored and/or determinations regarding brush wear may be made from images displayed at the processing unit 40. For example, measurement readings from the measuring device such as the vernier scale disclosed in FIGS. 11-13 may be taken at select temporal occasions and evaluation performed to determine conditions of the brush 24. In some embodiments, incidents of excess heating, arcing or excess vibration, which may indicate a need to perform maintenance and/or disrupt operation of the electrical equipment, may be identified and/or assessed with the monitoring system 10.

Thus, an operator may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24 based on measurement readings acquired from images displayed at the processing unit 40. For example, the operator may determine the change in position of the marker 350 relative to the extension 367, which may correspond to the linear displacement of the brush 24. Thus, the operator may determine the amount of wear (e.g., linear diminution) of the brush 24, during a specified time interval. Knowing the time interval between the evaluated images (e.g., the elapsed time between a first digital image and a second digital image), the operator may determine the wear rate of the brush 24. The operator may evaluate the present wear rate of the brush 24 with prior wear rates or modeled wear rates of the brush 24 in order to determine a projected wear rate of the brush 24 or other projected brush conditions, such as the life expectancy of the brush 24.

Additionally or alternatively, the operator may compare the present measurement of the measuring device with a predetermined threshold measurement. By comparing the present measurement of the measuring device with a threshold measurement, the operator may determine and/or evaluate positional characteristics of the brush 24. Thus, the operator may evaluate a condition of the brush 24 such as the wear state (e.g., the current stage in the lifecycle of the brush 24), life expectancy (e.g., how long until the brush 24 needs to be replaced) and/or the wear rate (e.g., the change in length per unit of time) of the brush 24. For example, in some embodiments, the operator, knowing the threshold measurement for displacement of the brush 24, may assess the present wear state of the brush 24 with the current or projected wear rate of the brush 24 in order to determine the life expectancy of the brush 24.

In some embodiments, the actual data may be compared with modeled data in order to predict or determine an estimated projection of a condition of the brush 24 into the future. Thus, the temporal occasion of surpassing a threshold condition of the brush 24, such as the moment when the desired diminution of the brush prior to replacement of the brush is reached at a future date, may be predicted, for example. Desired notification and/or scheduling tasks may be performed in view of the projected conditions of the brush 24.

The monitoring system 10 may also be used to identify and/or notify other key maintenance, failure of the brush holder assembly 320 and/or other anomalous conditions of a component of the electrical device. For example, incidents of excess heating, arcing or excess vibration, which may indicate a need to perform maintenance and/or disrupt operation of the electrical equipment, may be identified and/or assessed with the monitoring system 10. The software program or operator may carry out an appropriate response to respond to the anomalous condition identified by the processing unit 40 in an attempt to rectify the anomalous condition.

The exemplary embodiment shown in FIG. 14 utilizes a marker 450 including an indicator 452 and an extension 467 secured to or otherwise extending from a stationary component of the brush holder assembly 20 including a plurality of graduation or tick marks 468. It is noted that although the marker 450 is illustrated as including the indicator 452 and the extension 467 is illustrated as including the plurality of graduation or tick marks 468, in other embodiments, the extension 467 (or other stationary portion of the brush holder assembly 20) may include the indicator 452 and the marker 450 may include a plurality of graduation or tick marks 468.

Similar to the vernier scale illustrated in FIG. 10, the ruler-type scale illustrated in FIG. 14 may be used to determine the displacement of the brush 24, and thus a state of the brush 24, by evaluating and/or analyzing measurements utilizing the indicator 452 and/or graduated or tick marks 468. For example, an initial reading of the position of the indicator 452 along the graduation or tick marks 468 of the extension 467 may be initially taken. Then, subsequent readings of the position of the indicator 452 along the graduation or tick marks 468 of the extension 467 may be taken and compared to previous readings including the initial reading and/or other known parameters. Evaluation and/or processing of the acquired data may be performed to determine states of the brush 24 as discussed herein.

Figure 16:
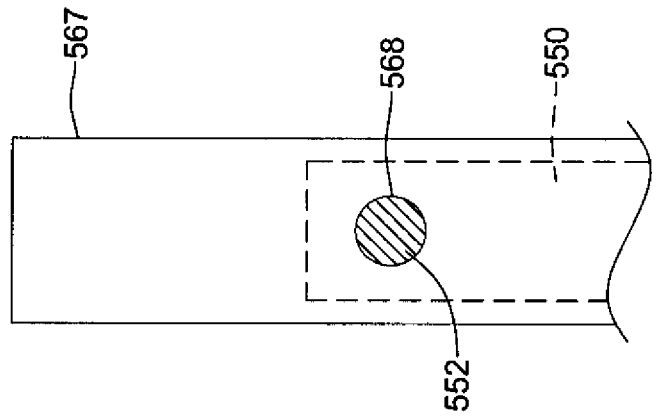
FIGS. 15 and 16 depict illustrative representations of images of yet another exemplary marker of a brush holder assembly.
Figure 15:
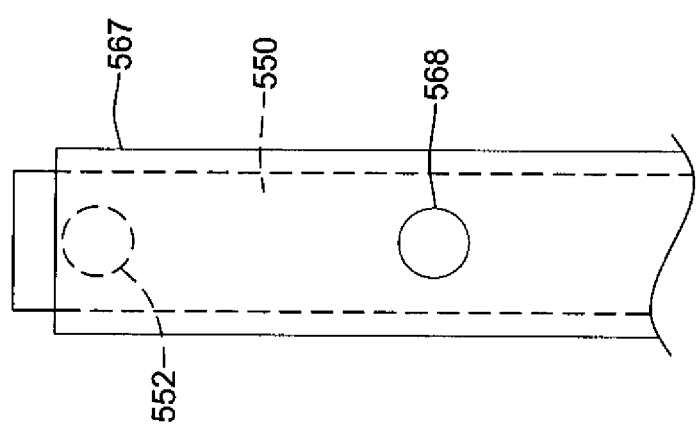

Another exemplary marker 550 which may be used to determine movement (e.g., diminution) of a brush 24 is shown in FIGS. 15 and 16. As shown in FIG. 15, the marker 550 may be positioned behind or within an extension 567. The extension 567 may be secured to or otherwise extend from a stationary component of the brush holder assembly 20, such as the marker guide 60. The marker 550 may include one or a plurality of indicia or markings 552, such as a colored dot, crosshairs, "X", or the like. The extension 567 may include an opening 568 allowing visualization of the marker 568 therethrough.

As shown in FIG. 15, the marking 552 may be initially misaligned with the opening 568 when a brush 24 is installed in the brush holder assembly 20. As the brush wears, the marker 550 may move, following linear displacement of the brush 24. Thus as the brush 24 wears, the marking 552 may approach the opening 568. At a subsequent temporal occasion, once the marker 552 has undergone sufficient longitudinal movement, the marking 552 may be aligned with the opening 568, as shown in FIG. 16. The moment the marking 552 is aligned with the opening 568 may be considered an indication that the brush 24 needs to be replaced.

Figure 17:
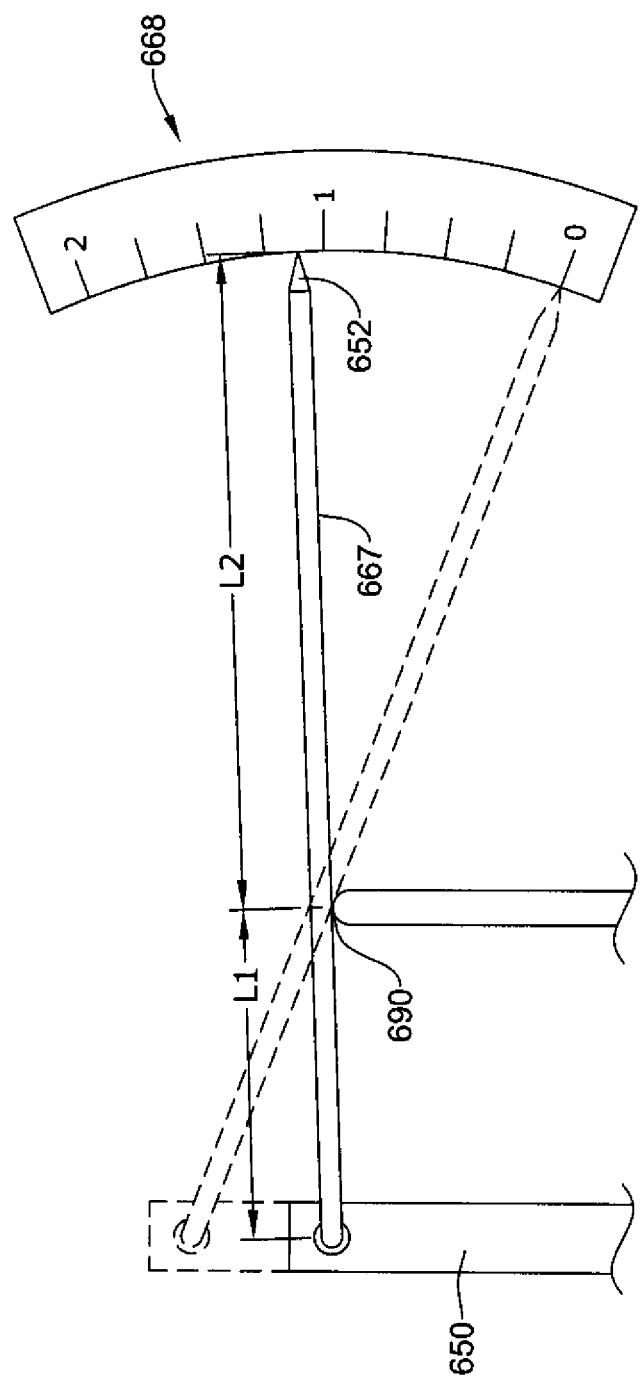
FIG. 17 is an illustrative representation of another exemplary apparatus including a brush wear indicator of a brush holder assembly.

In other embodiments, apparatus may be used to magnify, exaggerate, or otherwise amplify actual linear or longitudinal displacement of the brush to more definitively indicate degradation of the brush. One such exemplary embodiment is illustrated in FIG. 17. The apparatus may include a marker 650, which, in many respects, may be similar to other markers disclosed herein. The marker 650 may be attached to, embedded in, in contact with, or otherwise track or follow the movement of a brush 24 in a brush holder assembly 20. The marker 650 may include an arm 667 pivotably connected to the portion of the marker 650 tracking movement of a brush. The arm 667 may include an indicator 652, such as an arrow or similar pointing element, located in proximity to a scale 668 which may include tick marks or other visual indicia for measuring diminution of the brush. The arm 667 may extend across a stationary fulcrum 690 such that the portion of the arm 667 between the fulcrum 690 and the marker 650 has a length $L_1$ and the portion of the arm 667 between the fulcrum 690 and the indicator 652 proximate the scale 668 has a length $L_2$. In such an embodiment, movement of the indicator 652 will be proportional to movement of the brush in a ratio corresponding to the ratio between the length $L_2$ and the length $L_1$. Thus, by maintaining the length $L_2$ greater than the length $L_1$, movement of the indicator 652 will be proportionally greater than movement of the brush. For example, in instances in which the length $L_2$ of the arm 667 is twice the length $L_1$ of the arm 667, the indicator 652 will move twice as much as movement of the brush. Thus, in such an embodiment, movement of the indicator 652 along the graduation or tick marks of the scale 668 may be proportional to linear or longitudinal movement and/or diminution of the brush 24 as the brush 24 is worn. FIG. 17 illustrates the position of the marker 650 and indicator 652 at a time, $T_N$, while the dashed lines shown in FIG. 17 illustrate the position of the marker 650 and indicator 652 at a prior time, $T_{N-1}$.

Figure 18:
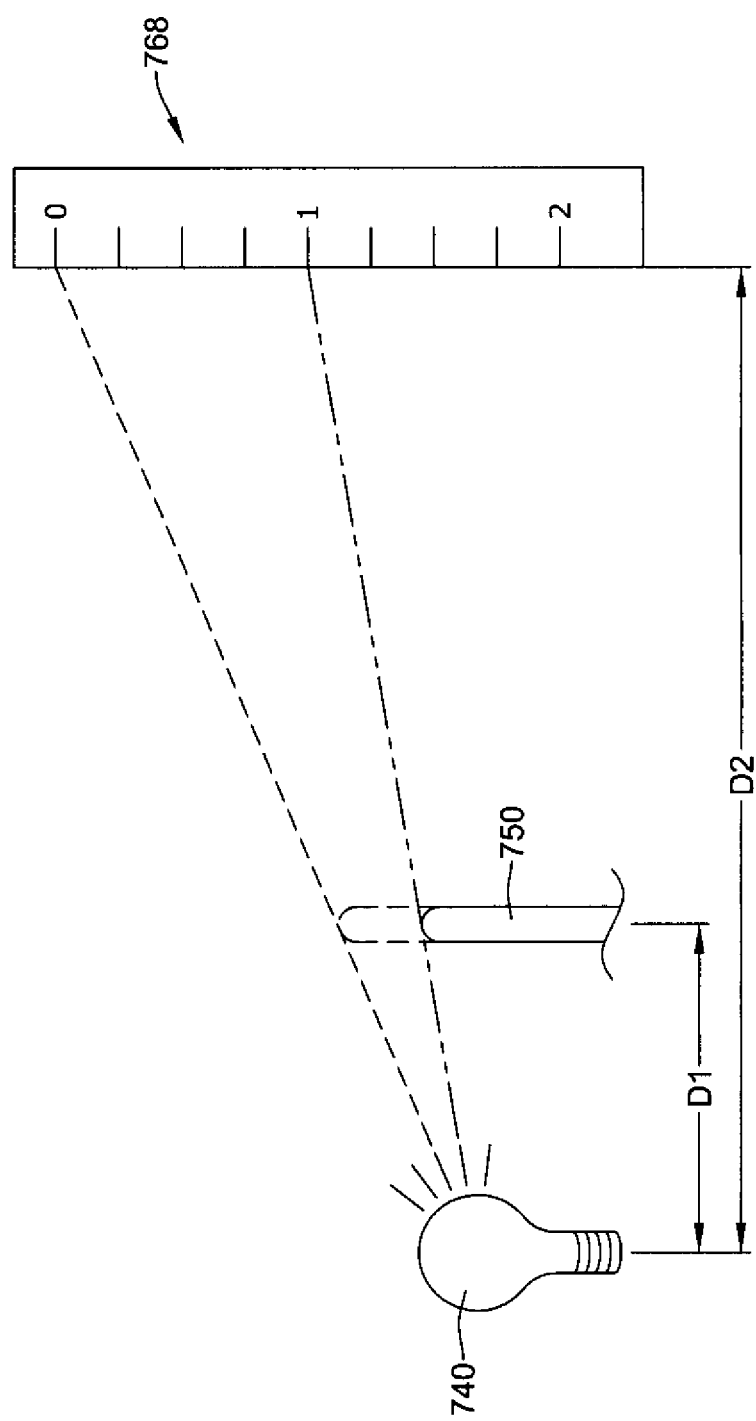
FIG. 18 is an illustrative representation of yet another exemplary apparatus including a brush wear indicator of a brush holder assembly.

Another exemplary embodiment in which apparatus may be used to magnify, exaggerate, or otherwise amplify actual linear or longitudinal displacement of the brush to more definitively indicate degradation of the brush is illustrated in FIG. 18. The apparatus may include a marker 750, which, in many respects, may be similar to other markers disclosed herein. The marker 750 may be attached to, embedded in, in contact with, or otherwise track or follow the movement of a brush 24 in a brush holder assembly 20. A light source 740 may be positioned to one side of the marker 750 such that the marker 750 is positioned between the light source 740 and a scale 768 which may include tick marks or other visual indicia for measuring diminution of a brush. The position of the marker 750 relative to the light source 740 and the scale 768 may cast a shadow of the marker 750 onto the scale 768. If the distance, $D_1$, between the light source 740 and the marker 750 and the distance, $D_2$, between the light source 740 and the scale 768 are known, movement of the brush may be computed by the projected shadow of the marker 750 on the scale 768. Movement of the brush will be proportional to movement of the shadow in a ratio corresponding to the ratio of the distance, $D_1$, between the light source 740 and the marker 750 to the distance, $D_2$, between the light source 740 and the scale 768. For example, in instances in which the distance, $D_2$, between the light source 740 and the scale 768 is twice the distance, $D_1$, between the light source 740 and the marker 750, the projected shadow on the scale 768 will move twice as much as movement of the brush. Thus, in such an embodiment, movement of the projected shadow on the scale 768 along the graduation or tick marks of the scale 768 may be proportional to linear or longitudinal movement and/or diminution of the brush 24 as the brush 24 is worn. The associated projected shadow of the marker 750 at a time, $T_N$, is shown in dashed lines in FIG. 18, while the associated projected shadow of the marker 750 at a prior time, $T_{N-1}$ is shown in dashed-dotted lines.

Processing and/or evaluation of the state of the brush, with or without the aid of a processing unit 40, using the marker 450, 550 illustrated in FIGS. 14-18 may include an image analysis technique, such as pixel-by-pixel comparison, analog or digital visualization or monitoring such as on a image display, or manual observation, for example. However, other techniques may be used in processing and/or evaluation of data acquired. For the sake of repetitiveness, a detailed discussion of evaluating the state of a brush using one of the markers 450, 550, 650, 750 which may be similar to those techniques disclosed above, will not be repeated.

Thus, as currently disclosed a brush monitoring system may monitor the position of a brush or a plurality of brushes within a brush holder assembly of an electrical equipment of a facility, such as an electricity generating facility, for example. In some embodiments, the brush monitoring system may remotely and/or wirelessly monitor the position of a brush or a plurality of brushes. A processing or control center, such as a central control center, may receive data from multiple facilities in order to monitor brush performance (e.g., brush wear) at each of the multiple facilities. The control center may be located remote from one or more electrical facilities (e.g., in a different building, facility, city, county, state, country, etc.). A processing unit, which may be located at the control center, may use a software program and or a monitor to analyze the performance of the brushes in operation at the facilities, such as the current relative position of each brush in operation, in order to evaluate a condition of the brushes such as the wear state (e.g., the current stage in the lifecycle of the brush), life expectancy (e.g., how long until the brush needs to be replaced) and/or the wear rate (e.g., the change in length per unit of time) of the brushes. The software program or monitor may alert an operator, technician and/or other personnel that a brush at one of the remote electrical facilities is sufficiently worn and/or needs to be replaced, a brush at one of the remote electrical facilities is damaged, failure has occurred or is imminent, or other maintenance may need to be performed. In some embodiments, the software program, or a technician at the control center, may schedule maintenance for one of the remote electrical facilities, send personnel to perform maintenance at one of the remote electrical facilities, order and/or schedule distribution/delivery of a replacement brush or other part to one of the remote electrical facilities, route maintenance personnel and/or product delivery to a specified location, such as one of the remote electrical facilities, or arrange for other notification and/or scheduling tasks be performed at one of the remote electrical facilities or another location. Thus, the currently disclosed brush monitoring system may continuously monitor brushes at a plurality of remote locations without direct human observation in order to alleviate the need of monitoring personnel at each remote location until it is determined that human intervention is necessary to attend to an identified problem or matter.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A method of monitoring a brush holder assembly of an electrical device including a carbon brush at a remote monitoring location, the carbon brush of the brush holder assembly being in contact with a rotating conductive surface, the brush holder assembly permitting linear movement of the carbon brush toward the rotating conductive surface as the carbon brush wears, the method comprising:
   acquiring data indicative of linear displacement of the carbon brush relative to the brush holder assembly; and
   evaluating the data to predict an estimated projection of a future condition of the carbon brush at a future date.

2. The method of claim 1, further comprising the step of: receiving the data at a central control unit off-site from the remote monitoring location.

3. The method of claim 1, wherein the step of evaluating the data is performed at the central control unit.

4. The method of claim 1, further comprising the step of: alerting personnel of an anomalous or threshold condition of the carbon brush at the remote monitoring location.

5. The method of claim 1, further comprising the step of: scheduling maintenance at the remote monitoring location.

6. The method of claim 1, further comprising the step of: routing personnel to the remote monitoring location.

7. The method of claim 1, further comprising the step of: scheduling distribution or delivery of a replacement brush to the remote monitoring location.

8. The method of claim 1, wherein the future condition of the carbon brush is a wear state in which the carbon brush needs to be replaced.

9. The method of claim 1, wherein the future condition of the carbon brush is a wear state in which the carbon brush has worn beyond a threshold amount.

10. The method of claim 1, wherein the step of evaluating the data includes comparing actual acquired data with modeled data.

11. A method of monitoring a brush holder assembly of an electrical device at a plurality of remote monitoring locations, the brush holder assembly at each of the plurality of remote monitoring locations including a carbon brush in contact with a rotating conductive surface, the brush holder assembly permitting linear movement of the carbon brush toward the rotating conductive surface as the carbon brush wears, the method comprising:

acquiring data indicative of linear displacement of each of the carbon brushes relative to the respective brush holder assembly at each of the plurality of remote monitoring locations;

evaluating the data to predict an estimated projection of a future condition of the carbon brush at a future date; and receiving the data at a central control unit in communication with the plurality of remote monitoring locations.

12. The method of claim 11, wherein the step of evaluating the data is performed with a processing unit at each of the plurality of remote monitoring locations.

13. The method of claim 11, wherein the step of evaluating the data is performed with a processing unit at the central control unit.

14. The method of claim 11, further comprising the step of:

alerting personnel of an anomalous or threshold condition at one of the plurality of remote monitoring locations.

15. The method of claim 11, further comprising the step of scheduling maintenance at one of the plurality of remote monitoring locations.

16. The method of claim 11, further comprising the step of routing personnel to one of the plurality of remote monitoring locations.

17. The method of claim 11, further comprising the step of scheduling distribution or delivery of a replacement brush to one of the plurality of remote monitoring locations.

18. The method of claim 11, wherein the plurality of remote monitoring locations are networked with the central control unit.

19. The method of claim 11, wherein the step of evaluating the data includes comparing actual acquired data with modeled data.

* * * * *